(12) United States Patent
Howard et al.

(10) Patent No.: US 10,157,170 B2
(45) Date of Patent: Dec. 18, 2018

(54) SYSTEM AND METHODS FOR THE SEGMENTATION OF MEDIA

(71) Applicant: EBAY INC., San Jose, CA (US)

(72) Inventors: Dane M. Howard, Los Gatos, CA (US); James W. Lanahan, Palo Alto, CA (US); Brian F. Williams, San Carlos, CA (US)

(73) Assignee: eBay, Inc., San Jose, CA (US)

( * ) Notice: Subject to any disclaimer, the term of this patent is extended or adjusted under 35 U.S.C. 154(b) by 258 days.

(21) Appl. No.: 14/144,199

(22) Filed: Dec. 30, 2013

(65) Prior Publication Data

US 2014/0108931 A1    Apr. 17, 2014

Related U.S. Application Data

(63) Continuation of application No. 12/495,493, filed on Jun. 30, 2009, now Pat. No. 8,620,893.

(Continued)

(51) Int. Cl.
*G06F 3/00* (2006.01)
*G06F 17/24* (2006.01)
(Continued)

(52) U.S. Cl.
CPC .......... *G06F 17/241* (2013.01); *G06F 3/0482* (2013.01); *G06F 3/04817* (2013.01); *G06F 17/211* (2013.01); *G06F 17/212* (2013.01); *G06F 17/2247* (2013.01); *G06F 17/24* (2013.01); *G06F 17/3005* (2013.01); *G06F 17/30023* (2013.01); *G06F 17/30029* (2013.01); *G06F 17/30058* (2013.01);
(Continued)

(58) Field of Classification Search
CPC ........... G06F 17/30011; G06F 17/2247; G06F 17/241; G06F 17/243; G06F 17/24; G06F 17/211; G06F 17/30017; G06F 17/218; G06F 17/212; G06F 9/543; G06F 9/4443; G06F 3/0481; G06F 9/0482; G06F 9/04847; G06F 9/048; G06Q 10/10; G06Q 10/107; G11B 27/034; G11B 27/34; G11B 27/105; G11B 27/031; G11B 27/28; H04N 21/4622; H04N 21/47; H04N 5/44543; H04N 5/4401; H04N 5/74
USPC ....... 715/204, 704, 200–202, 224, 226, 234, 715/716, 717, 719, 720, 723–725, 730, 715/731, 733, 764, 769; 707/204, 704
See application file for complete search history.

(56) References Cited

U.S. PATENT DOCUMENTS 5,541,662 A    6/1996 Adams
5,539,871 A    7/1996 Gibson
(Continued)

FOREIGN PATENT DOCUMENTS

JP    2008-183330    8/2008
WO    2000/007110    2/2000
(Continued)

OTHER PUBLICATIONS

US 10,108,583, 10/2018, Lanahan et al. (withdrawn)
(Continued)

*Primary Examiner* — Shourjo Dasgupta
(74) *Attorney, Agent, or Firm* — Wolfe-SBMC

(57) ABSTRACT

A computer implemented method for the collection and segmentation of media through search and segmentation settings.

19 Claims, 20 Drawing Sheets

Related U.S. Application Data

(60) Provisional application No. 61/078,288, filed on Jul. 3, 2008.

(51) Int. Cl.

| | | |
|---|---|---|
| *G06F 17/30* | (2006.01) | |
| *G06T 11/60* | (2006.01) | |
| *G06F 3/0482* | (2013.01) | |
| *G06F 17/21* | (2006.01) | |
| *G06F 17/22* | (2006.01) | |
| *G06F 3/0481* | (2013.01) | |
| *G06Q 30/02* | (2012.01) | |

(52) U.S. Cl.
CPC .. *G06F 17/30398* (2013.01); *G06F 17/30598* (2013.01); *G06F 17/30684* (2013.01); *G06F 17/30867* (2013.01); *G06F 17/30905* (2013.01); *G06T 11/60* (2013.01); *G06Q 30/02* (2013.01); *G06T 2200/24* (2013.01)

(56) References Cited

U.S. PATENT DOCUMENTS

| | | |
|---|---|---|
| 5,559,942 A | 9/1996 | Gough et al. |
| 5,578,808 A | 11/1996 | Taylor |
| 5,666,554 A | 9/1997 | Tanaka |
| 5,708,845 A | 1/1998 | Wistendahl et al. |
| 5,844,557 A | 12/1998 | Shively, II |
| 5,860,073 A | 1/1999 | Ferrel |
| 5,918,012 A | 6/1999 | Astiz et al. |
| 5,933,817 A | 8/1999 | Hucal |
| 6,008,807 A | 12/1999 | Bretschneider et al. |
| 6,038,552 A | 3/2000 | Fleischl et al. |
| 6,097,389 A | 8/2000 | Morris et al. |
| 6,259,457 B1 | 7/2001 | Davies |
| 6,397,196 B1 | 5/2002 | Kravetz et al. |
| 6,470,100 B2 | 10/2002 | Horiuschi |
| 6,515,656 B1 | 2/2003 | Wittenburg |
| 6,647,383 B1 | 11/2003 | August et al. |
| 6,751,776 B1 * | 6/2004 | Gong ............... G06F 17/30616 707/E17.028 |
| 6,769,095 B1 | 7/2004 | Brassard |
| 6,834,282 B1 | 12/2004 | Bonneau |
| 7,023,452 B2 | 4/2006 | Oshiyama et al. |
| 7,181,468 B2 | 2/2007 | Spring et al. |
| 7,237,185 B1 | 6/2007 | Sequeira |
| 7,276,290 B2 | 10/2007 | Anderson et al. |
| 7,296,242 B2 | 11/2007 | Agate et al. |
| 7,376,290 B2 | 5/2008 | Anderson et al. |
| 7,502,795 B1 | 3/2009 | Svendsen et al. |
| 7,546,554 B2 | 6/2009 | Chiu et al. |
| 7,573,486 B2 | 8/2009 | Mondry |
| 7,576,555 B2 | 8/2009 | Hashimoto |
| 7,576,755 B2 | 8/2009 | Sun et al. |
| RE41,210 E | 4/2010 | Wang |
| 7,725,494 B2 | 5/2010 | Rogers et al. |
| 7,752,548 B2 | 7/2010 | Mercer |
| 7,768,535 B2 | 8/2010 | Reid et al. |
| 7,805,382 B2 | 9/2010 | Rosen et al. |
| 7,814,560 B2 | 10/2010 | Bellagamba et al. |
| 7,836,110 B1 | 11/2010 | Schoenbach et al. |
| 7,885,951 B1 | 2/2011 | Rothschild |
| 7,982,909 B2 | 7/2011 | Beato |
| 8,006,192 B1 | 8/2011 | Reid et al. |
| 8,010,629 B2 | 8/2011 | Williams et al. |
| 8,024,658 B1 | 9/2011 | Fagans et al. |
| 8,082,328 B2 | 12/2011 | Hull et al. |
| 8,103,546 B1 * | 1/2012 | Des Jardins ....... G06Q 30/0241 365/200 |
| 8,121,902 B1 | 2/2012 | Desjardins |
| 8,316,084 B2 | 11/2012 | Lanahan et al. |
| 8,365,092 B2 | 1/2013 | Lanahan et al. |
| 8,560,565 B2 | 10/2013 | Howard et al. |
| 8,620,893 B2 | 12/2013 | Howard et al. |
| 8,627,192 B2 | 1/2014 | Lanahan et al. |
| 8,667,160 B1 | 3/2014 | Haot et al. |
| 8,789,094 B1 | 7/2014 | Singh |
| 8,799,952 B2 | 8/2014 | Gossweiler |
| 8,812,945 B2 * | 8/2014 | Sidon .................. G06F 17/3028 715/202 |
| 8,893,015 B2 | 11/2014 | Lanahan et al. |
| 9,043,726 B2 | 5/2015 | Lanahan et al. |
| 9,430,448 B2 | 8/2016 | Howard et al. |
| 9,613,006 B2 | 4/2017 | Lanahan et al. |
| 9,639,505 B2 | 5/2017 | Lanahan et al. |
| 9,658,754 B2 | 5/2017 | Lanahan et al. |
| 2001/0034740 A1 | 10/2001 | Kerne |
| 2001/0044825 A1 | 11/2001 | Barritz |
| 2001/0044835 A1 | 11/2001 | Schnober |
| 2002/0023111 A1 | 2/2002 | Arora et al. |
| 2002/0080165 A1 | 6/2002 | Wakefield |
| 2002/0083178 A1 | 6/2002 | Brothers |
| 2002/0091600 A1 | 7/2002 | Kravetz et al. |
| 2002/0108122 A1 | 8/2002 | Alao et al. |
| 2002/0112093 A1 | 8/2002 | Slotznick |
| 2002/0135621 A1 | 9/2002 | Angiulo et al. |
| 2002/0138428 A1 | 9/2002 | Spear |
| 2002/0152233 A1 | 10/2002 | Cheong et al. |
| 2002/0164151 A1 * | 11/2002 | Jasinschi ........... G06F 17/30796 386/241 |
| 2002/0180803 A1 | 12/2002 | Kaplan |
| 2003/0046222 A1 | 3/2003 | Bard et al. |
| 2003/0098877 A1 | 5/2003 | Boegelund |
| 2003/0149983 A1 | 8/2003 | Markel |
| 2004/0008226 A1 | 1/2004 | Manolis et al. |
| 2004/0054579 A1 | 3/2004 | Lamb et al. |
| 2004/0083080 A1 | 4/2004 | Reghetti et al. |
| 2004/0143796 A1 | 7/2004 | Lerner et al. |
| 2004/0184778 A1 | 9/2004 | Jung et al. |
| 2004/0199574 A1 | 10/2004 | Franco et al. |
| 2004/0001106 A1 | 12/2004 | Deutscher et al. |
| 2004/0268224 A1 | 12/2004 | Balkus et al. |
| 2005/0094014 A1 | 5/2005 | Haas et al. |
| 2005/0114356 A1 | 5/2005 | Bhatti |
| 2005/0114754 A1 | 5/2005 | Miller et al. |
| 2005/0114784 A1 | 5/2005 | Spring et al. |
| 2005/0138193 A1 | 6/2005 | Encarnacion et al. |
| 2005/0228749 A1 | 10/2005 | Lozano |
| 2005/0234981 A1 | 10/2005 | Manousos et al. |
| 2005/0237952 A1 | 10/2005 | Punj |
| 2005/0268227 A1 * | 12/2005 | Carlson .................. G06F 17/248 715/223 |
| 2005/0268279 A1 | 12/2005 | Paulsen et al. |
| 2005/0273693 A1 | 12/2005 | Peterson |
| 2006/0010162 A1 * | 1/2006 | Stevens ............. G06F 17/30038 |
| 2006/0061595 A1 | 3/2006 | Goede et al. |
| 2006/0064642 A1 * | 3/2006 | Iyer ....................... G06F 17/211 715/730 |
| 2006/0069989 A1 | 3/2006 | Jones |
| 2006/0070005 A1 | 3/2006 | Gilbert et al. |
| 2006/0086843 A1 | 4/2006 | Lin et al. |
| 2006/0089843 A1 | 4/2006 | Flather |
| 2006/0106693 A1 | 5/2006 | Carlson et al. |
| 2006/0112081 A1 | 5/2006 | Qureshi |
| 2006/0114510 A1 | 6/2006 | Maeng |
| 2006/0123455 A1 | 6/2006 | Pai et al. |
| 2006/0129917 A1 | 6/2006 | Volk et al. |
| 2006/0181736 A1 | 8/2006 | Quek et al. |
| 2006/0184574 A1 | 8/2006 | Wu et al. |
| 2006/0193008 A1 * | 8/2006 | Osaka .................. G06F 17/211 358/1.18 |
| 2006/0195789 A1 | 8/2006 | Rogers et al. |
| 2006/0203294 A1 * | 9/2006 | Makino ................ G06F 17/211 358/400 |
| 2006/0206811 A1 | 9/2006 | Dowdy |
| 2006/0230332 A1 | 10/2006 | Lin |
| 2006/0256739 A1 | 11/2006 | Seier et al. |
| 2006/0271691 A1 | 11/2006 | Jacobs et al. |
| 2006/0277482 A1 | 12/2006 | Hoffman et al. |
| 2006/0287989 A1 | 12/2006 | Glance |
| 2007/0016930 A1 | 1/2007 | Wesemann |
| 2007/0033059 A1 | 2/2007 | Adkins |
| 2007/0038931 A1 | 2/2007 | Allaire |

(56) References Cited

U.S. PATENT DOCUMENTS

| | | |
|---|---|---|
| 2007/0050718 A1 | 3/2007 | Moore et al. |
| 2007/0061266 A1 | 3/2007 | Moore |
| 2007/0061715 A1 | 3/2007 | Chartier et al. |
| 2007/0074110 A1 | 3/2007 | Miksovsky et al. |
| 2007/0078989 A1 | 4/2007 | Van Datta et al. |
| 2007/0113250 A1* | 5/2007 | Logan ............... H04N 7/17318 725/46 |
| 2007/0118801 A1 | 5/2007 | Harshbarger et al. |
| 2007/0136194 A1 | 6/2007 | Sloan |
| 2007/0136244 A1 | 6/2007 | MacLaurin et al. |
| 2007/0156382 A1* | 7/2007 | Graham, II ............ G06Q 10/00 703/22 |
| 2007/0162853 A1 | 7/2007 | Weber et al. |
| 2007/0162856 A1* | 7/2007 | Schlossberg ........... G06Q 30/00 715/730 |
| 2007/0186182 A1 | 8/2007 | Schiller |
| 2007/0204209 A1* | 8/2007 | Truelove ........... G06F 17/30056 715/203 |
| 2007/0239770 A1 | 10/2007 | Enock et al. |
| 2007/0253028 A1 | 11/2007 | Widdowson |
| 2007/0262995 A1* | 11/2007 | Tran ..................... G11B 27/034 345/473 |
| 2008/0021829 A1 | 1/2008 | Kranzley |
| 2008/0027798 A1 | 1/2008 | Ramamurthi et al. |
| 2008/0034295 A1 | 2/2008 | Kulas |
| 2008/0040683 A1 | 2/2008 | Walsh |
| 2008/0077530 A1 | 3/2008 | Banas |
| 2008/0081662 A1 | 4/2008 | Strandell et al. |
| 2008/0086688 A1 | 4/2008 | Chandratillake |
| 2008/0086689 A1 | 4/2008 | Berkley et al. |
| 2008/0092054 A1 | 4/2008 | Bhumkar et al. |
| 2008/0120278 A1 | 5/2008 | Roe et al. |
| 2008/0126191 A1* | 5/2008 | Schiavi .............. G06Q 30/0258 705/14.56 |
| 2008/0134018 A1 | 6/2008 | Kembel et al. |
| 2008/0165960 A1 | 7/2008 | Woo |
| 2008/0195477 A1 | 8/2008 | Kennedy |
| 2008/0195962 A1 | 8/2008 | Lin et al. |
| 2008/0205694 A1 | 8/2008 | Sagoo et al. |
| 2008/0215680 A1 | 9/2008 | Salesky et al. |
| 2008/0215985 A1 | 9/2008 | Batchelder et al. |
| 2008/0222560 A1 | 9/2008 | Harrison |
| 2008/0270905 A1 | 10/2008 | Goldman |
| 2008/0276279 A1 | 11/2008 | Gossweiler et al. |
| 2008/0288460 A1 | 11/2008 | Poniatowski et al. |
| 2008/0301546 A1 | 12/2008 | Moore et al. |
| 2008/0306995 A1* | 12/2008 | Newell ............. G06F 17/30265 |
| 2009/0007023 A1 | 1/2009 | Sundstrom |
| 2009/0083161 A1 | 3/2009 | Mital |
| 2009/0087161 A1 | 4/2009 | Roberts et al. |
| 2009/0119256 A1 | 5/2009 | Waters |
| 2009/0132415 A1 | 5/2009 | Davis et al. |
| 2009/0177546 A1 | 7/2009 | Dijk et al. |
| 2009/0210391 A1 | 8/2009 | Hall et al. |
| 2009/0254515 A1* | 10/2009 | Terheggen .......... G06F 17/3002 |
| 2009/0271283 A1 | 10/2009 | Fosnacht et al. |
| 2009/0276425 A1 | 11/2009 | Phillips et al. |
| 2009/0292681 A1 | 11/2009 | Wood et al. |
| 2009/0319530 A1 | 12/2009 | Hoertnagl |
| 2010/0005066 A1 | 1/2010 | Howard et al. |
| 2010/0005067 A1 | 1/2010 | Howard et al. |
| 2010/0005068 A1 | 1/2010 | Howard et al. |
| 2010/0005119 A1 | 1/2010 | Howard et al. |
| 2010/0005139 A1 | 1/2010 | Lanahan et al. |
| 2010/0005379 A1 | 1/2010 | Lanahan et al. |
| 2010/0005380 A1 | 1/2010 | Lanahan et al. |
| 2010/0005397 A1 | 1/2010 | Lanahan et al. |
| 2010/0005408 A1 | 1/2010 | Lanahan et al. |
| 2010/0005417 A1 | 1/2010 | Lanahan et al. |
| 2010/0005498 A1 | 1/2010 | Lanaha |
| 2010/0023849 A1 | 1/2010 | Hakim et al. |
| 2010/0036812 A1 | 2/2010 | Choi et al. |
| 2010/0042628 A1 | 2/2010 | Crowley et al. |
| 2010/0083077 A1 | 4/2010 | Paulsen et al. |
| 2010/0083303 A1 | 4/2010 | Redei et al. |
| 2010/0115410 A1 | 5/2010 | Fu et al. |
| 2010/0162375 A1 | 6/2010 | Tiu |
| 2010/0281386 A1 | 11/2010 | Lyons et al. |
| 2010/0332565 A1 | 12/2010 | Al-Shaykh et al. |
| 2011/0022966 A1 | 1/2011 | Rose |
| 2011/0060979 A1 | 3/2011 | O'Brein-Strain |
| 2011/0285748 A1 | 11/2011 | Slatter et al. |
| 2014/0122985 A1 | 5/2014 | Lanahan et al. |
| 2015/0074502 A1 | 3/2015 | Lanahan et al. |
| 2015/0254212 A1 | 9/2015 | Lanahan et al. |
| 2016/0371266 A1 | 12/2016 | Howard et al. |
| 2017/0199847 A1 | 7/2017 | Lanahan et al. |
| 2017/0235450 A1 | 8/2017 | Lanahan et al. |
| 2017/0235712 A1 | 8/2017 | Lanahan et al. |

FOREIGN PATENT DOCUMENTS

| | | |
|---|---|---|
| WO | 2000/056055 | 9/2000 |
| WO | 2010/003111 A1 | 1/2010 |
| WO | 2010/003121 A1 | 1/2010 |

OTHER PUBLICATIONS

Wikipedia, "File Manager", https://en.wikipedia.org/wiki/File_manager, provided to establish well-known aspects in the art as it relates to file managers, e.g. what they are.*

Asterpix—SeachLight: Content Discovery Made Easy, available at http://www.asterpix.com/searchlight/ (1 page).

eHow How to Create a clickable image map with Dreamweaver, Feb. 16, 2008, 2 pages.

Using Adobe Acrobat, Apr. 9, 2004, 17 pages.

Golden Nugget—Screen shots—2 pages at media.psx.ign.com/media/000/000295/imgs_1.html-.

Looks Good Works Well by Bill Scotts, Musings on Rich Web Design and User Interface Engineering—7 pages at http://looksgoodworkswell.golgspot.com/2006/03/maind-hacking-visual-transi_11437691330. . . .

Gus Hansen's Exclusive Poker Tips Video #1 (bluffing) 0 at www.dailymotion.com/video/x3op2y_gus-hansens-exclusive-poker-tips-vi_videogames—2 pages.

Golden Nugget @ www.absolute-playstation.com/api_review/rgnugg.gtm—5 pages.

World Poker Tour Deals Twelve Million Hands of WPT Texas Hold'Em and Receives Industry Accolades: Feb. 26, 2008; 4 pages; wireless.ign.com/articles/854/854954pl.htm.

WPT Mobile; World Poker Tour; 1 page 2008; wptmobile.handson.com/wpt_texas_hold_em_2.pho?performcheck=2.

European Summons in Application 09774560.8, dated May 3, 2017, 16 pages.

"Free Word 2003 Tutorial at GCFLearnFree", Jan. 1, 2003, http://www.gcflearnfree.org/word2003/insterting-hyperlinnks/1, 2 pages.

Taylor, "Crystal Reports 10: Adding a Hyperlink to a Report" In Crystal reports 10 for Dummies, Jun. 1, 2004, 6 pages.

U.S. Appl. No. 14/722,030, Office Action dated Jun. 19, 2017, 11 pages.

U.S. Appl. No. 15/250,763, Amendment and Response filed Aug. 7, 2017, 11 pages.

U.S. Appl. No. 12/347,747, Advisory Action dated May 24, 2017, 3 pages.

Dorothy Burke, "How to use Lotus Notes 6", Mar. 4, 2003, 4 pages.

eBay the Chatter Check out the eBay to Go Widget, May 17, 2007, 3 pages.

Formatting Shapes and Objects, www.functionx.com/powerpoint/Lesson11.htm, Dec. 14, 2007, 8 pages.

Google Operating System, Upload Files in a Browser Using Drag and Drop, http://googlesystems.blogspot.com/2007/02/upload-files-in-browser-using-drag-and.html, Feb. 23, 2007, 1 page.

Josh Lowensohn, CNET eBay does MySpace-compatible widgets, May 1, 2007, 3 pages.

Michael Arrington, eBay Launches "togo" Widgets for any listing, Apr. 30, 2007, 2 pages.

(56) References Cited

OTHER PUBLICATIONS

Microsoft FrontPage 2003 Image Maps: Creating Hotspots, Sep. 29, 2004, 5 pages.
Naj My Depictions Ebay to Go—New Widget to Display Listing, Mar. 22, 2007, 3 pages.
PCT International Preliminary Report on Patentability in PCT/US2009/049606, dated Jan. 5, 2011, 5 pages.
PCT International Preliminary Report on Patentability in PCT/US2009/49622, dated Jan. 5, 2011, 5 pages.
PCT International Search Report and Written Opinion in PCT/US2009/049606, dated Aug. 14, 2009, 6 pages.
PCT International Search Report and Written Opinion in PCT/US2009/49622, dated Aug. 14, 2009, 6 pages.
Shelly Brisbin, "Clickable Image Maps in Adobe GoLive", Mar. 30, 2001, 3 pages.
U.S. Appl. No. 12/347,638, Advisory Action dated Dec. 7, 2016, 3 pages.
U.S. Appl. No. 12/347,638, Amendment and Response filed Dec. 5, 2011, 10 pages.
U.S. Appl. No. 12/347,638, Amendment and Response filed Jul. 11, 2012, 11 pages.
U.S. Appl. No. 12/347,638, Amendment and Response filed Jan. 24, 2013, 11 pages.
U.S. Appl. No. 12/347,638, Amendment and Response filed Aug. 20, 2013, 11 pages.
U.S. Appl. No. 12/347,638, Amendment and Response filed Jan. 3, 2014, 12 pages.
U.S. Appl. No. 12/347,638, Amendment and Response filed Jul. 25, 2014, 14 pages.
U.S. Appl. No. 12/347,638, Amendment and Response filed Apr. 29, 2015, 12 pages.
U.S. Appl. No. 12/347,638, Amendment and Response filed Nov. 17, 2015, 11 pages.
U.S. Appl. No. 12/347,638, Amendment and Response filed Jun. 21, 2016, 11 pages.
U.S. Appl. No. 12/347,638, Amendment and Response filed Nov. 28, 2016, 13 pages.
U.S. Appl. No. 12/347,638, Notice of Allowance dated Dec. 30, 2016, 5 pages.
U.S. Appl. No. 12/347,638, Office Action dated Sep. 8, 2011, 10 pages.
U.S. Appl. No. 12/347,638, Office Action dated Apr. 19, 2012, 11 pages.
U.S. Appl. No. 12/347,638, Office Action dated Oct. 26, 2012, 12 pages.
U.S. Appl. No. 12/347,638, Office Action dated May 21, 2013, 11 pages.
U.S. Appl. No. 12/347,638, Office Action dated Oct. 4, 2013, 12 pages.
U.S. Appl. No. 12/347,638, Office Action dated Apr. 25, 2014, 12 pages.
U.S. Appl. No. 12/347,638, Office Action dated Feb. 10, 2015, 15 pages.
U.S. Appl. No. 12/347,638, Office Action dated Aug. 17, 2015, 15 pages.
U.S. Appl. No. 12/347,638, Office Action dated Jan. 15, 2016, 16 pages.
U.S. Appl. No. 12/347,638, Office Action dated Sep. 26, 2016, 15 pages.
U.S. Appl. No. 12/347,747, Amendment and Response filed Apr. 20, 2011, 11 pages.
U.S. Appl. No. 12/347,747, Amendment and Response filed Oct. 5, 2011, 16 pages.
U.S. Appl. No. 12/347,747, Amendment and Response filed Apr. 23, 2012, 11 pages.
U.S. Appl. No. 12/347,747, Amendment and Response filed Oct. 8, 2014, 13 pages.
U.S. Appl. No. 12/347,747, Amendment and Response filed May 4, 2015, 15 pages.
U.S. Appl. No. 12/347,747, Amendment and Response filed Feb. 18, 2016, 14 pages.
U.S. Appl. No. 12/347,747, Amendment and Response filed Jun. 30, 2016, 13 pages.
U.S. Appl. No. 12/347,747, Amendment and Response filed Dec. 2, 2016, 10 pages.
U.S. Appl. No. 12/347,747, Amendment and Response filed May 10, 2017, 11 pages.
U.S. Appl. No. 12/347,747, Office Action dated Jan. 24, 2011, 9 pages.
U.S. Appl. No. 12/347,747, Office Action dated Jul. 7, 2011, 8 pages.
U.S. Appl. No. 12/347,747, Office Action dated Jan. 25, 2012, 14 pages.
U.S. Appl. No. 12/347,747, Office Action dated Jul. 8, 2014, 9 pages.
U.S. Appl. No. 12/347,747, Office Action dated Feb. 2, 2015, 10 pages.
U.S. Appl. No. 12/347,747, Office Action dated Nov. 18, 2015, 11 pages.
U.S. Appl. No. 12/347,747, Office Action dated Mar. 31, 2016, 12 pages.
U.S. Appl. No. 12/347,747, Office Action dated Sep. 2, 2016, 15 pages.
U.S. Appl. No. 12/347,747, Office Action dated Mar. 10, 2017, 14 pages.
U.S. Appl. No. 12/347,749, Amendment and Response filed Jun. 22, 2011, 9 pages.
U.S. Appl. No. 12/347,749, Amendment and Response filed Dec. 2, 2011, 9 pages.
U.S. Appl. No. 12/347,749, Amendment and Response filed Mar. 23, 2012, 10 pages.
U.S. Appl. No. 12/347,749, Amendment and Response filed Oct. 4, 2012, 13 pages.
U.S. Appl. No. 12/347,749, Amendment and Response filed May 7, 2013, 13 pages.
U.S. Appl. No. 12/347,749, Notice of Allowance dated Aug. 28, 2013, 11 pages.
U.S. Appl. No. 12/347,749, Office Action dated Mar. 24, 2011, 8 pages.
U.S. Appl. No. 12/347,749, Office Action dated Sep. 2, 2011, 7 pages.
U.S. Appl. No. 12/347,749, Office Action dated Dec. 23, 2011, 9 pages.
U.S. Appl. No. 12/347,749, Office Action dated Jul. 17, 2012, 10 pages.
U.S. Appl. No. 12/347,749, Office Action dated Feb. 13, 2013, 13 pages.
U.S. Appl. No. 12/347,829, Amendment and Response filed Dec. 29, 2011, 13 pages.
U.S. Appl. No. 12/347,829, Amendment and Response filed Sep. 12, 2012, 13 pages.
U.S. Appl. No. 12/347,829, Notice of Allowance dated Sep. 27, 2012, 8 pages.
U.S. Appl. No. 12/347,829, Office Action dated Oct. 5, 2011, 12 pages.
U.S. Appl. No. 12/347,829, Office Action dated Jun. 14, 2012, 12 pages.
U.S. Appl. No. 12/495,438, Amendment and Response filed Sep. 20, 2011, 11 pages.
U.S. Appl. No. 12/495,438, Amendment and Response filed Feb. 10, 2012, 12 pages.
U.S. Appl. No. 12/495,438, Amendment and Response filed Sep. 21, 2012, 12 pages.
U.S. Appl. No. 12/495,438, Amendment and Response filed Apr. 3, 2013, 12 pages.
U.S. Appl. No. 12/495,438, Notice of Allowance dated Jun. 11, 2013, 16 pages.
U.S. Appl. No. 12/495,438, Office Action dated Jun. 20, 2011, 15 pages.
U.S. Appl. No. 12/495,438, Office Action dated Nov. 21, 2011, 15 pages.

(56) References Cited

OTHER PUBLICATIONS

U.S. Appl. No. 12/495,438, Office Action dated Jun. 21, 2012, 13 pages.
U.S. Appl. No. 12/495,438, Office Action dated Jan. 3, 2013, 15 pages.
U.S. Appl. No. 12/495,493, Amendment and Response filed Nov. 1, 2011, 11 pages.
U.S. Appl. No. 12/495,493, Amendment and Response filed Mar. 23, 2012, 10 pages.
U.S. Appl. No. 12/495,493, Notice of Allowance dated Aug. 26, 2013, 12 pages.
U.S. Appl. No. 12/495,493, Office Action dated Aug. 2, 2011, 18 pages.
U.S. Appl. No. 12/495,493, Office Action dated Dec. 28, 2011, 17 pages.
U.S. Appl. No. 12/495,520, Amendment and Response filed Jun. 1, 2011, 9 pages.
U.S. Appl. No. 12/495,520, Amendment and Response filed Jan. 11, 2012, 12 pages.
U.S. Appl. No. 12/495,520, Amendment and Response filed Jan. 22, 2013, 12 pages.
U.S. Appl. No. 12/495,520, Amendment and Response filed Jul. 1, 2013, 13 pages.
U.S. Appl. No. 12/495,520, Amendment and Response filed Oct. 22, 2013, 14 pages.
U.S. Appl. No. 12/495,520, Amendment and Response filed Apr. 16, 2014, 18 pages.
U.S. Appl. No. 12/495,520, Amendment and Response filed Jul. 22, 2014, 18 pages.
U.S. Appl. No. 12/495,520, Amendment and Response filed Dec. 16, 2014, 15 pages.
U.S. Appl. No. 12/495,520, Amendment and Response filed Dec. 10, 2015, 20 pages.
U.S. Appl. No. 12/495,520, Notice of Allowance dated Apr. 25, 2016, 8 pages.
U.S. Appl. No. 12/495,520, Office Action dated Mar. 3, 2011, 22 pages.
U.S. Appl. No. 12/495,520, Office Action dated Oct. 18, 2011, 29 pages.
U.S. Appl. No. 12/495,520, Office Action dated Oct. 24, 2012, 31 pages.
U.S. Appl. No. 12/495,520, Office Action dated Apr. 2, 2013, 33 pages.
U.S. Appl. No. 12/495,520, Office Action dated Jul. 22, 2013, 34 pages.
U.S. Appl. No. 12/495,520, Office Action dated Jan. 16, 2014, 34 pages.
U.S. Appl. No. 12/495,520, Office Action dated Apr. 22, 2014, 35 pages.
U.S. Appl. No. 12/495,520, Office Action dated Sep. 16, 2014, 34 pages.
U.S. Appl. No. 12/495,520, Office Action dated Sep. 10, 2015, 39 pages.
U.S. Appl. No. 12/495,684, Amendment and Response filed Feb. 8, 2012, 11 pages.
U.S. Appl. No. 12/495,684, Amendment and Response filed Jul. 6, 2012, 10 pages.
U.S. Appl. No. 12/495,684, Amendment and Response filed Feb. 28, 2014, 11 pages.
U.S. Appl. No. 12/495,684, Notice of Allowance dated Jul. 7, 2014, 15 pages.
U.S. Appl. No. 12/495,684, Office Action dated Nov. 15, 2011, 12 pages.
U.S. Appl. No. 12/495,684, Office Action dated Apr. 10, 2012, 16 pages.
U.S. Appl. No. 12/495,684, Office Action dated Dec. 2, 2013, 14 pages.
U.S. Appl. No. 12/495,718, Amendment and Response filed Feb. 10, 2012, 13 pages.
U.S. Appl. No. 12/495,718, Amendment and Response filed May 22, 2012, 22 pages.
U.S. Appl. No. 12/495,718, Amendment and Response filed Sep. 24, 2013, 12 pages.
U.S. Appl. No. 12/495,718, Amendment and Response filed Mar. 31, 2014, 12 pages.
U.S. Appl. No. 12/495,718, Amendment and Response filed Dec. 30, 2014, 15 pages.
U.S. Appl. No. 12/495,718, Notice of Allowance dated Jan. 26, 2015, 12 pages.
U.S. Appl. No. 12/495,718, Office Action dated Nov. 15, 2011, 10 pages.
U.S. Appl. No. 12/495,718, Office Action dated Feb. 27, 2012, 11 pages.
U.S. Appl. No. 12/495,718, Office Action dated Jun. 28, 2013, 10 pages.
U.S. Appl. No. 12/495,718, Office Action dated Dec. 30, 2013, 11 pages.
U.S. Appl. No. 12/495,718, Office Action dated Sep. 30, 2014, 10 pages.
U.S. Appl. No. 12/495,748, Amendment and Response filed Feb. 7, 2012, 13 pages.
U.S. Appl. No. 12/495,748, Amendment and Response filed Jul. 11, 2012, 12 pages.
U.S. Appl. No. 12/495,748, Notice of Allowance dated Jul. 18, 2012, 6 pages.
U.S. Appl. No. 12/495,748, Office Action dated Nov. 8, 2011, 8 pages.
U.S. Appl. No. 12/495,748, Office Action dated Apr. 17, 2012, 5 pages.
U.S. Appl. No. 12/495,756, Amendment and Response filed May 2, 2011, 12 pages.
U.S. Appl. No. 12/495,756, Notice of Allowance dated Jun. 15, 2011, 9 pages.
U.S. Appl. No. 12/495,756, Office Action dated Feb. 2, 2011, 15 pages.
U.S. Appl. No. 14/149,140, Amendment and Response filed Jun. 24, 2016, 13 pages.
U.S. Appl. No. 14/149,140, Notice of Allowance dated Nov. 18, 2016, 8 pages.
U.S. Appl. No. 14/149,140, Office Action dated Mar. 24, 2016, 18 pages.
U.S. Appl. No. 14/149,140, Office Action dated Oct. 20, 2016, 13 pages.
U.S. Appl. No. 14/547,083, 312 Amendment filed Apr. 12, 2017, 3 pages.
U.S. Appl. No. 14/547,083, Amendment and Response filed Jul. 20, 2016, 11 pages.
U.S. Appl. No. 14/547,083, Amendment and Response filed Dec. 22, 2016, 12 pages.
U.S. Appl. No. 14/547,083, Notice of Allowance dated Jan. 13, 2017, 9 pages.
U.S. Appl. No. 14/547,083, Office Action dated Apr. 20, 2016, 11 pages.
U.S. Appl. No. 14/547,083, Office Action dated Nov. 3, 2016, 13 pages.
U.S. Appl. No. 14/547,083, Response to 312 Amendment dated Apr. 27, 2017, 2 pages.
U.S. Appl. No. 15/250,763, Amendment and Response filed Apr. 13, 2017, 11 pages.
U.S. Appl. No. 15/250,763, Office Action dated Jan. 13, 2017, 16 pages.
U.S. Appl. No. 15/250,763, Office Action dated May 5, 2017, 13 pages.
Warner, "Dreamweaver CS3 for Dummies" May 7, 2007, 12 pages. Retrieved from the Internet URL: <https://web.archive.org/web/20090731120449/http://blog.justswell.org/drag-and-drop-files-from-your-desktop-to-your-browser-using-javascript/>, Jul. 28, 2009, 6 pages.
U.S. Appl. No. 14/722,030, Amendment and Response filed Sep. 19, 2017, 18 pages.
U.S. Appl. No. 14/722,030, Notice of Allowance dated Oct. 19, 2017, 9 pages.

(56) References Cited

OTHER PUBLICATIONS

U.S. Appl. No. 15/250,763, Office Action dated Aug. 31, 2017, 14 pages.
U.S. Appl. No. 15/250,763, Amendment and Response filed Nov. 30, 2017, 9 pages.
U.S. Appl. No. 12/347,747, Office Action dated Dec. 29, 2017, 17 pages.
Communication Pursuant to Article 94(3) EPC received for European Patent Application No. 09774560.8, dated Nov. 10, 2014, 7 pages.
Response to Communication Pursuant to Article 94(3) EPC filed Mar. 20, 2015 for European Patent Application No. 09774560.8, dated Nov. 10, 2014, 2 pages.
Response to Extended European Search Report filed Jan. 9, 2014 for European Patent Application No. 09774560.8, dated Jun. 26, 2013, 12 pages.
Supplementary European Search Report received for European Patent Application No. 09774560.8, dated Jun. 26, 2013, 6 pages.
Communication Pursuant to Article 94(3) EPC received for European Patent Application No. 09774570.7, dated Sep. 16, 2013, 5 pages.
Response to Communication pursuant to Rules 94(3) EPC filed Jan. 27, 2014 for European Patent Application No. 09774570.7, dated Sep. 16, 2013, 10 pages.
Supplementary European Search Report received for European Patent Application No. 09774570.7, dated Nov. 22, 2011, 8 pages.
Preliminary Amendment for U.S. Appl. No. 15/584,993, filed May 2, 2017, 7 pages.
Applicant Initiated Interview Summary received for U.S. Appl. No. 12/347,747, dated Apr. 3, 2018, 3 pages.
Response to Non-Final Office Action filed Mar. 28, 2018 for U.S. Appl. No. 12/347,747, dated Dec. 29, 2017, 17 pages.
Preliminary Amendment for U.S. Appl. No. 15/583,704, filed May 1, 2017, 7 pages.
Notice of Allowance received for U.S. Appl. No. 12/495,756, dated Jul. 19, 2011, 3 pages.
Notice of Allowance received for U.S. Appl. No. 14/722,030, dated Feb. 27, 2018, 7 pages.
Response to Notice of Allowance filed Jan. 19, 2018 for U.S. Appl. No. 14/722,030, dated Oct. 19, 2017, 7 pages.
Applicant Initiated Interview Summary received for U.S. Appl. No. 15/250,763, dated Apr. 16, 2018, 3 pages.
Applicant Initiated Interview Summary received for U.S. Appl. No. 15/250,763 dated Dec. 4, 2017, 3 pages.
Final Office Action received for U.S. Appl. No. 15/250,763, dated Mar. 27, 2018, 11 pages.
Non-Final Office Action received for U.S. Appl. No. 15/452,474, dated Feb. 6, 2018, 13 pages.
Preliminary Amendment for U.S. Appl. No. 15/452,474, filed Jul. 5, 2017, 7 pages.
Response to Non-Final Office Action filed May 4, 2018 for U.S. Appl. No. 15/452,474, dated Feb. 6, 2018, 10 pages.
Summons to Attend Oral Proceedings received for EP Application No. 09774570.7, dated Oct. 14, 2015, 7 pages.
Final Office Action received for U.S. Appl. No. 12/347,747, dated Jul. 12, 2018, 11 pages.
Notice of Allowance received for U.S. Appl. No. 14/722,030, dated Jun. 11, 2018, 7 pages.
Advisory Action received for U.S. Appl. No. 15/250,763, dated Jul. 5, 2018, 3 pages.
Response to Final Office Action filed May 29, 2018, for U.S. Appl. No. 15/250,763, dated Mar. 27, 2018, 18 pages.
Final Office Action received for U.S. Appl. No. 15/452,474, dated Jul. 16, 2018, 16 pages.
Applicant-Initiated Interview Summary received for U.S. Appl. No. 15/250,763, dated Oct. 2, 2018, 4 pages.
Non-Final Office Action received for U.S. Appl. No. 15/250,763, dated Sep. 20, 2018, 12 pages.
Pre-Appeal Brief filed for U.S. Appl. No. 12/347,747, on Oct. 12, 2018, 5 pages.
Response to Final Office Action filed Oct. 18, 2018 for U.S. Appl. No. 15/452,474, dated Jul. 16, 2018, 16 pages.

\* cited by examiner

SYSTEM AND METHODS FOR THE SEGMENTATION OF MEDIA

CROSS-REFERENCE TO RELATED APPLICATIONS

This application is a continuation of Ser. No. 12/495,493, filed Jun. 30, 2009, which claims priority and the benefit of U.S. Provisional Patent Application No. 61/078,288, filed Jul. 3, 2008, entitled, "Multi-media Online Presentation System and Method," all of which are incorporated herein by reference in their entirety.

BACKGROUND

Field of Invention

The present invention generally relates to the collection of media, and more particularly to a system and methods for the search, collection, saving, and segmentation of media for use in, among other things, a network-based multimedia presentation.

Related Art

Multimedia is media and content that utilizes a combination of different content forms. The term is used in contrast to media that only utilizes traditional forms of printed or hand-produced text and still graphics. In general, multimedia includes a combination of text, audio, still images, animation, video, and interactivity content forms. Multimedia is usually recorded and played, displayed, or accessed by information content processing devices, such as computerized and electronic devices. Multimedia finds its application in various areas including, but not limited to, social marketing, advertisement, art, education, entertainment, engineering, medicine, mathematics, business, scientific research and spatial temporal applications.

A variety of online websites are presently available to enable the creation and presentation including the publication of some form of multimedia. For example, MixerCast enables a user to build a social marketing application from scratch. Scrapblog enables a user to combine photos, videos, audio and text to create multimedia scrapbooks. Smilebox facilitates "creative messaging" that draws elements from photo services, scrapbooking, and e-cards.

Each website will typically provide one or more online tools for the creation and customization of the multimedia. Such online tools and/or desktop tools such as Photoshop, Illustrator, etc., allow the user to collect, edit, create, and publish or distribute the multimedia. In this regard, various style presentations may be utilized, photos may be resized and text may be added, video may be inserted, and/or links to other sites or presentations may be provided. Despite providing some level of customization, multimedia tools currently available are often cumbersome and difficult to use and thus limit the self-expression and creativity of the non-professional user when creating multimedia presentations. Accordingly, there exists a need for a relatively more robust multimedia creation tool including a system and methods for the search, collection, saving, and segmentation of media for use in, among other things, a network-based multimedia presentation.

SUMMARY

For purposes of summarizing the disclosure, exemplary embodiments of systems and methods for automatic media population of a style presentation have been described herein.

In one embodiment, a computer implemented method for the collection and segmentation of media, the method comprises selecting a media search source via a user interface; providing a form-based interface that allow the entry of inputs to form a media search query; submitting the media search query to the media search source; receiving a media search result for viewing on the user interface based on the media search query, the media search result comprising media items; displaying the media search result in a collection depository on the user interface; and dividing at least one of the media items into a plurality of relatively smaller segments, wherein the method is performed by one or more processors adapted to execute instructions stored on one or more memory components of the computer.

In another embodiment, a computer system for the collection and segmentation of media, the system comprises a storage device; a processing element having a processing program and access to the storage device; and a process-readable medium having executable instructions thereon to direct the processing system when used by the processing element to: select a media search source via a user interface; provide a form-based interface that allow the entry of inputs to form a media search query; submit the media search query to the media search source; receive a media search result for viewing on the user interface based on the media search query, the media search result comprising media items; display the media search result in a collection depository on the user interface; and divide at least one of the media items into a plurality of relatively smaller segments.

In still another embodiment, a computer-readable medium having a computer executable instructions for performing a method comprises selecting a media search source via a user interface; providing a form-based interface that allow the entry of inputs to form a media search query; submitting the media search query to the media search source; receiving a media search result for viewing on the user interface based on the media search query, the media search result comprising media items; displaying the media search result in a collection depository on the user interface; and dividing at least one of the media items into a plurality of relatively smaller segments.

These and other features and advantages of the present invention will be more readily apparent from the detailed description of the embodiments set forth below taken in conjunction with the accompanying drawings.

BRIEF DESCRIPTION OF THE DRAWINGS

FIGS. 2A-2M show elements, components, or stages for the search, collection, edit, and saving of media in accordance with one embodiment.

FIGS. 2N-2R show elements, components, or stages for the automatic media population of a style presentation in accordance with one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure related to systems and methods for the automatic media population of a style presentation. As indicated above, multimedia presentations may find application in various areas including, but not limited to, social marketing, advertisement, art, education, entertainment, engineering, medicine mathematics, business, scientific research and spatial temporal applications.

Figure 1:
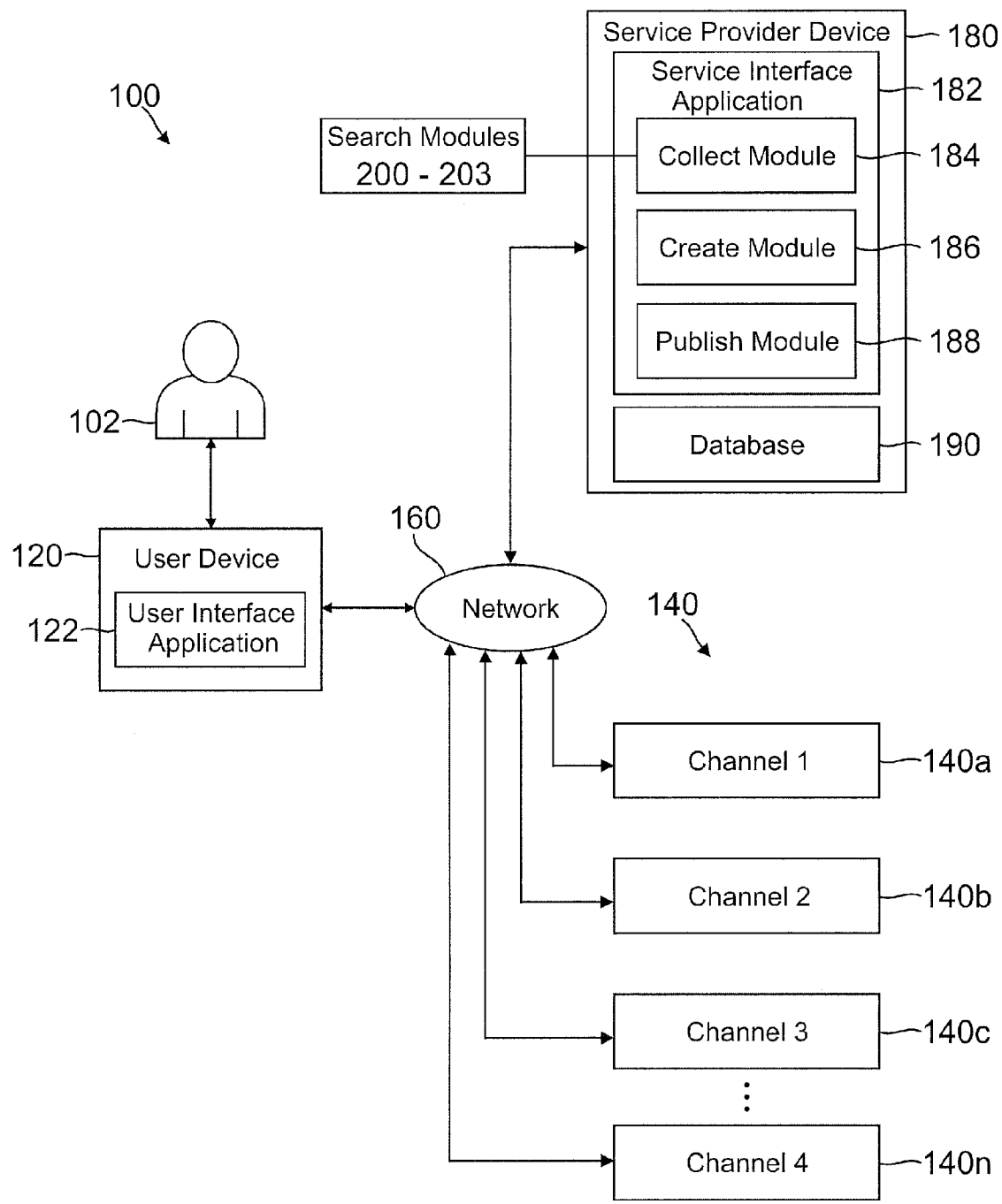
FIG. 1 shows a block diagram of a system configured to facilitate the creation and publishing and/or sharing of multimedia presentations over a network.

In one embodiment a system and method provides for a robust end-to-end digital media creation architecture that enables a user to create rich multimedia presentations and clips online with real-time editing and authoring, and then share or publish the media online. As shown in FIG. 1, the system 100 includes at least one client device 120 (e.g., network computing device), one or more multimedia distribution channels 140 (e.g., network server devices), and at least one service provider device 180 (e.g., network server device) in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multimedia distribution channels 140, and the at least one service provider device 180 may be associated with a particular link (e.g., a link, such as a URL (Uniform Resource Locator) to an IP (Internet Protocol) address).

In various embodiments, the at least one client device 120 may be implemented using any appropriate combination of hardware and/or software configured for wired and/or wireless communication over the network 160. The client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

In one embodiment, the client device 120 includes a user interface application 122 that may be utilized by a user 102 to conduct information transactions with the distribution channels 140 and the service provider server 180 over the network 160. For example, the user interface application 122 may be implemented as a multimedia presentation application to collect, create and publish information via the network 160. In various implementations, multimedia presentations may be published to and/or shared with one or more of the multimedia channels 140 via the user interface application 122 over the network 160.

In one implementation, the user interface application 122 comprises a software program, such as a graphical user interface (GUI), executable by a processor that is configured to interface and communicate with the multimedia channels 140 and the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, each member of the user group 102 is able to access multimedia websites via the one or more multimedia channels 140 to view, collect and publish multimedia presentations over the network 160.

In various embodiments, the client device 120 may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multimedia software directly into the user interface application 122 for ease of access to multimedia files (e.g., audio, video, pictures, clip-art, etc.).

The client device 120 may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing and/or sharing of a multimedia presentation.

In one embodiment, the multimedia distribution channels 140 may be maintained by one or more resource providers and/or entities (e.g., social networking sites, resource information sites, management sites, merchant sites, etc.) in communication with the network 160. In this regard, the service provider server 180, discussed below, may maintain or provide access to the one or more of the multimedia distribution channels. The multimedia distribution channels 140 may be implemented using any appropriate combination of hardware and/or software configured for wired and/or wireless communication over the network 160. In one implementation, the multimedia distribution channels 140 may be implemented as a network computing device (e.g., a network server) in wired and/or wireless communication with the network 160.

In one embodiment, the service provider server 180 may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160.

As further shown in FIG. 1, the service provider server 180 includes a service interface application 182, which may be adapted to interact with the client device 120 to facilitate the collection of media, as well as the creation including editing and the publishing and/or sharing of multimedia presentations over a network. In one example, the service provider server 180 may be provided and implemented by PayPal, Inc. of San Jose, Calif., USA.

The service application 182, in one embodiment, utilizes a collect module 184, a create module 186, and a publish module 188 running on a standard web browser to collect information, create presentations, and publish presentations, respectively. As described in greater detail herein, the modules 184, 186, 188 enable users, such as the user 102, to collect diverse types of audio and visual media, create rich multimedia presentations with real-time editing and authoring using media software, such as Flash, and then share and/or publish the rich multimedia presentations with other users via the network 160. In one example, the collect, create, and publish modules 184, 186, 188 may be implemented within a standard web browser for interfacing with the user 102.

In one implementation, the user 102 is able to share multimedia presentations with other users via the media channels 140 and/or embed multimedia presentations directly in webpages of other users. For example, the user 102 may provide a unique URL link for the multimedia presentation to other users. In another example, the user 102 may directly email multimedia presentations to multiple recipients and include a message with the email. In still another example, the user 102 may provide the source HTML (i.e., HyperText Markup Language) code to other users and/or embed the source HTML code directly into another user's webpage. Still other examples include the ability to publish multimedia presentations on a website to sell a particular item or service for purchase. For items and/or services, a media rich presentation may help users market and sell items and/or services, which may be valuable for high-end or high-priced items and/or services. Social and/or dating sites may utilize these multimedia presentations to provide online users with a way to better present themselves to other online users. In various implementations, some type of webpage may be presented in a more dynamic manner by utilizing Rich Site Summary (RSS) Feeds, since, for example, a particular user's presentation may be continually changing with new media.

In various embodiments, the service provider server 180 may be configured to maintain, store and/or archive multimedia presentations in a database 190, each of which may include information related to one or more users, such as the user 102, and one or more multimedia channels, such as multimedia distributions channels 140. In various examples, the multimedia presentations may include attributes stored as part thereof, and the attributes may be passed to the service provider server 180 as part of a creating, publishing and/or sharing the multimedia presentations.

Referring to FIG. 1 and FIGS. 2A-2M, in one embodiment, the collect module 184 includes search modules 200, 201, 202, 203, etc., to enable the user 102 to search, collect, view, and, store/save media including multimedia. Such media including audio, photographic images, video, and music media from a service source, such as a PC, RSS feeds, websites, and any other online source, is searched and collected via a user interface, such as the user interface application 122, to a collection depository or library 123 associated with and viewable at same time as the storyboard 124 on the GUI of the interface application 122.

Figure 2A:
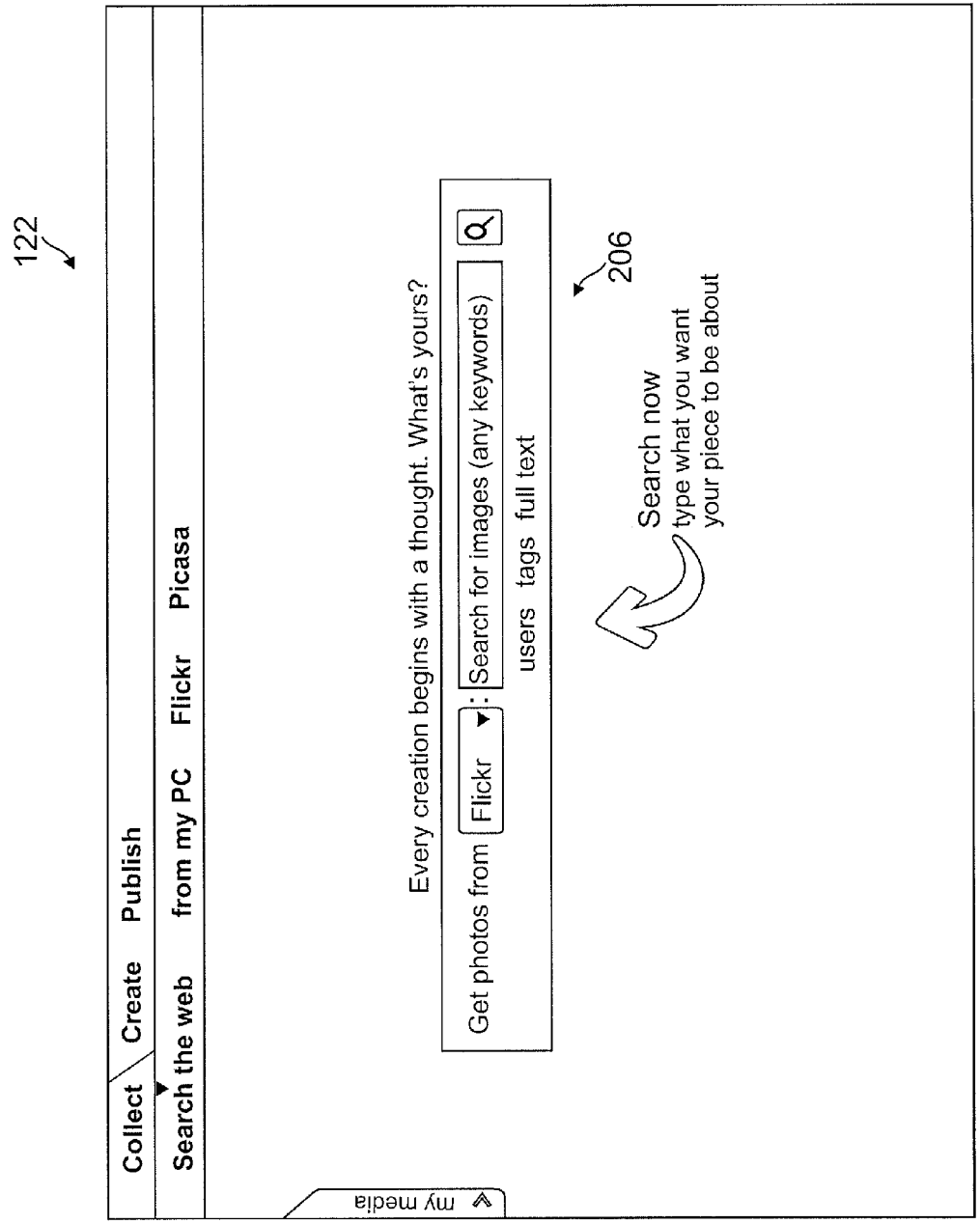
Figure 2B:
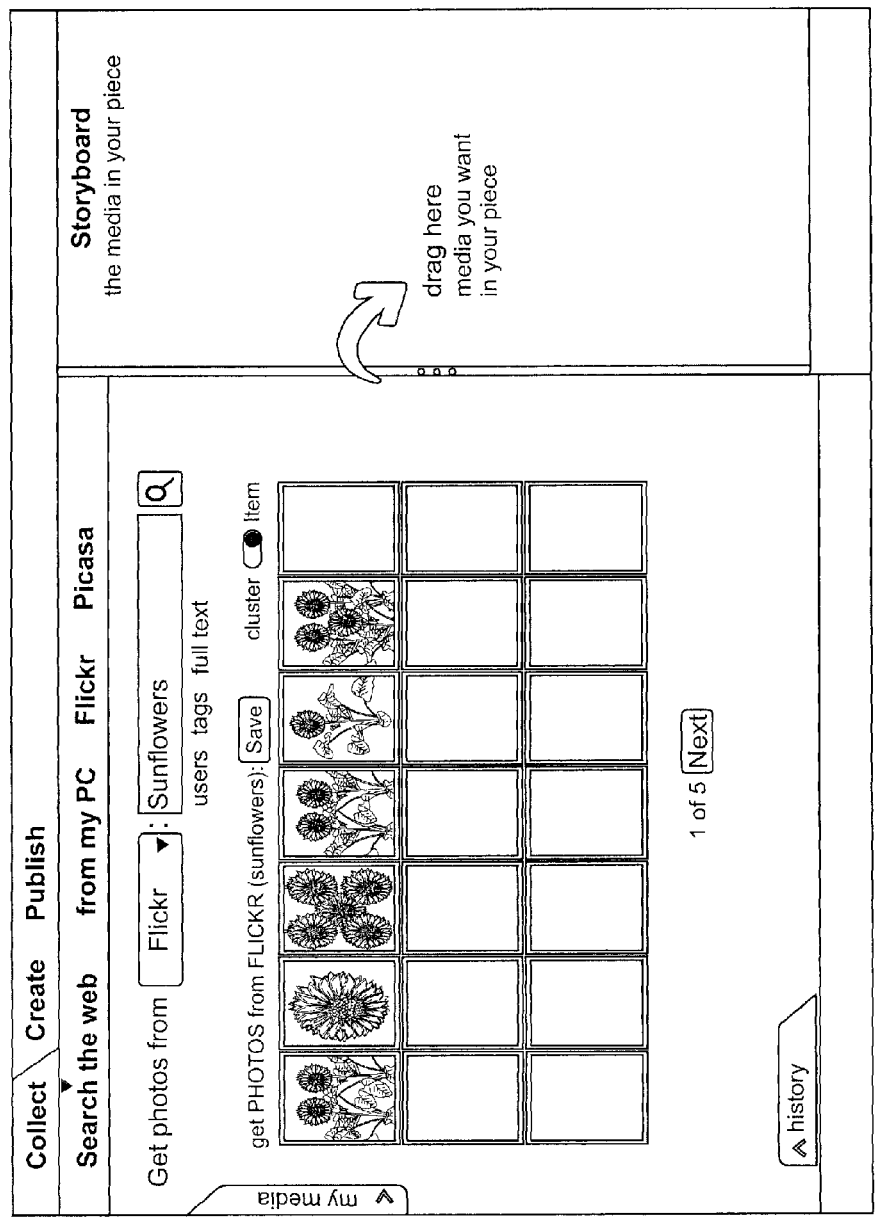
Figure 2C:
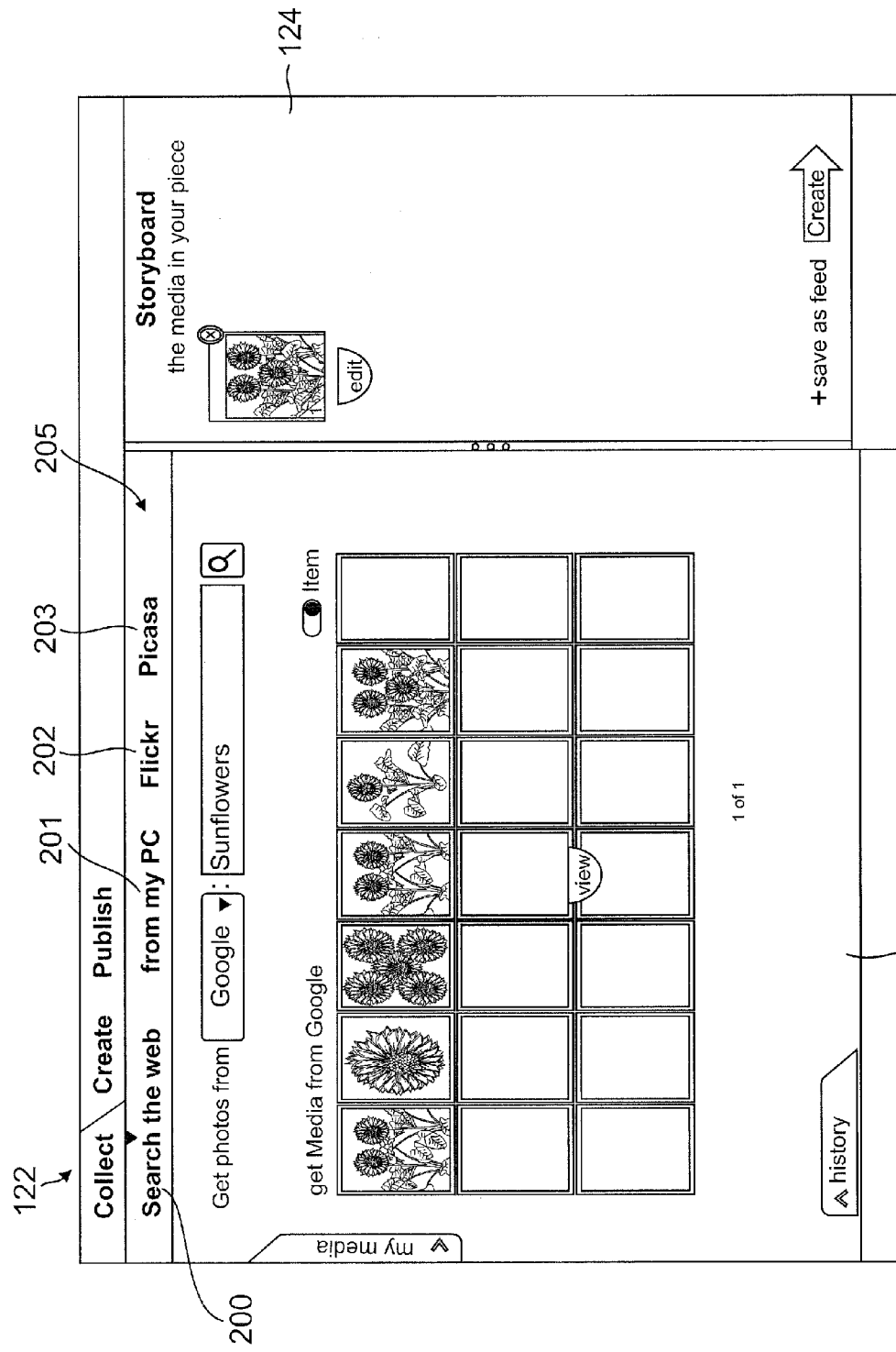

In various implementations, the user interface application 122 comprises multiple search tabs and/or links for the various search sources. Search-based modules 200-203 are aggregated in a drop-down combo interface 205 indexed by media type and media provider (FIG. 2C). Each search provider or search source advertises the media types it indexes, and the number of type of inputs the search provider handles. For example, a search of the Flickr community may be done via "user", "tag", or "full text". When a search provider or search source is selected, the user interface updates 206 to show a form-based interface that allows the user to enter necessary query inputs (FIG. 2A). Depending on the type of search provider or search source, when the user initiates a search, the request goes either to a service system server-side component 180 or directly to a third-party server-side component. When the request is to the search system the server-side component handles all details of contacting the third party API, avoiding any browser security issues, and allowing any results from the third-party to be normalized and cached, if desired. When requests go directly to the third-party server, that is a search source or search provider other than the service provider 180, the requests are subject to cross-site data restrictions imposed by the browsers and the Flash environment, and additional logic is needed to normalize any results to the service provider data model.

Search base modules may include account-based modules such as Flickr 202, mentioned above, and Picasa 203 that present an authentication interface allowing a user to connect to the user's public and/or private photos at a third-party hosting service. Depending on the APIs supported by the third-party, users can browse, sort, and select media from corresponding user accounts once the associated user has be authenticated.

Figure 2D:
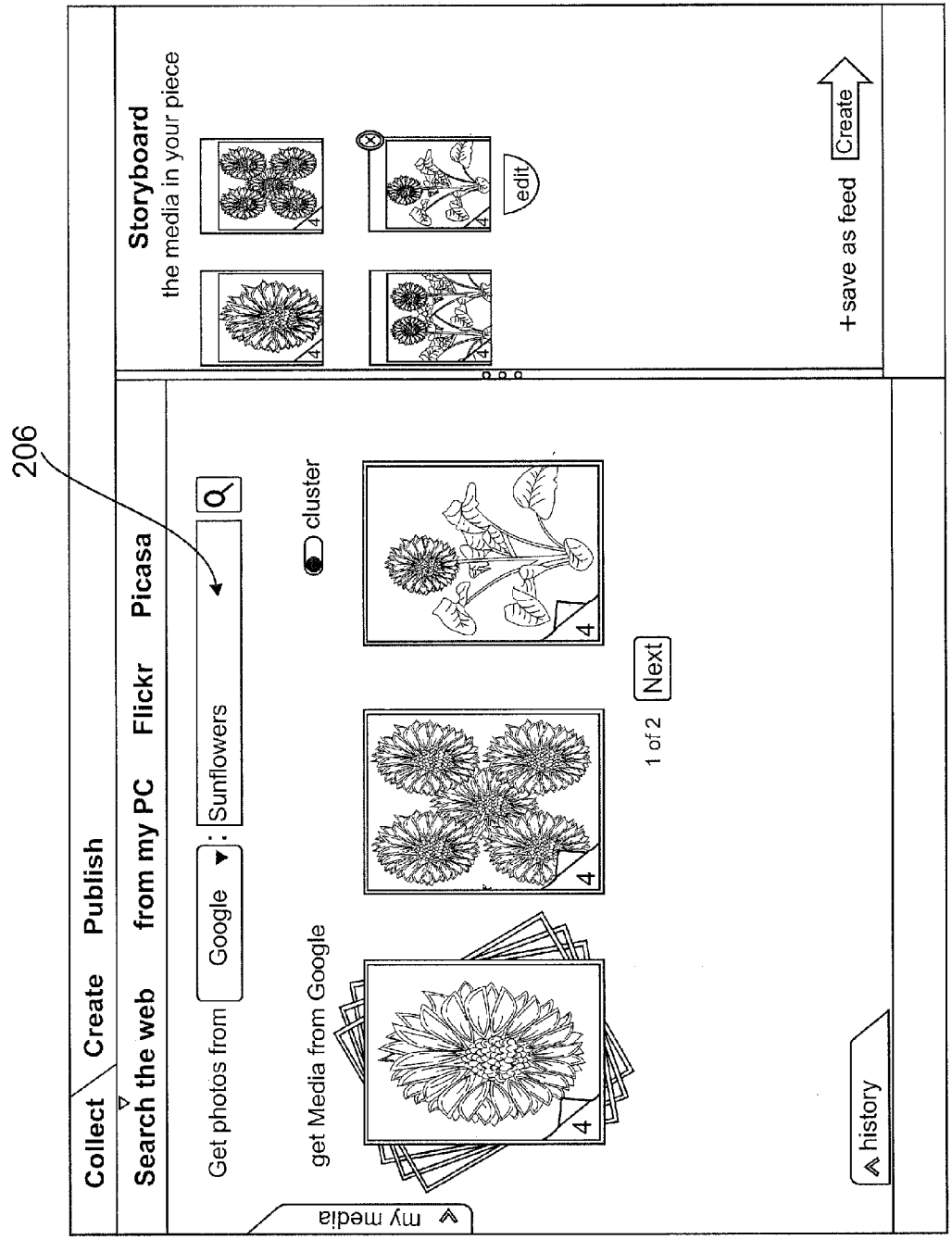

Use of the collect module enables key words to be selected to form a search query to search photos in Flickr or videos in YouTube. For example, selecting the "full text" search criteria and typing in "sunflowers" in a Flickr search query results in pictures of sunflowers or photos from Flickr being presented on the user's GUI or media page. A result of the aforementioned search query in Flickr is shown in FIG. 2B. The collected media (sunflowers) may be viewed individually as shown in FIG. 2C or as photo clusters as shown in FIG. 2D.

In this regard, the collect module or step enables the user to cluster media associated with a variable number of related media items in the collection depository and that can be dragged and dropped into the storyboard 124. The storyboard 124 is generally considered an area of the GUI reserved for the media that is later used in the creation of rich multimedia presentations. In this regard, during the process of media collection, the collection depository 123 may include multiple photos from a first search source, multiple photos from a second search source, or multiple videos from yet another search source while the storyboard 124 includes only those photos, videos, images, etc., that are at least at some point intended to be included in the creation of a rich multimedia presentation.

Figure 2E:
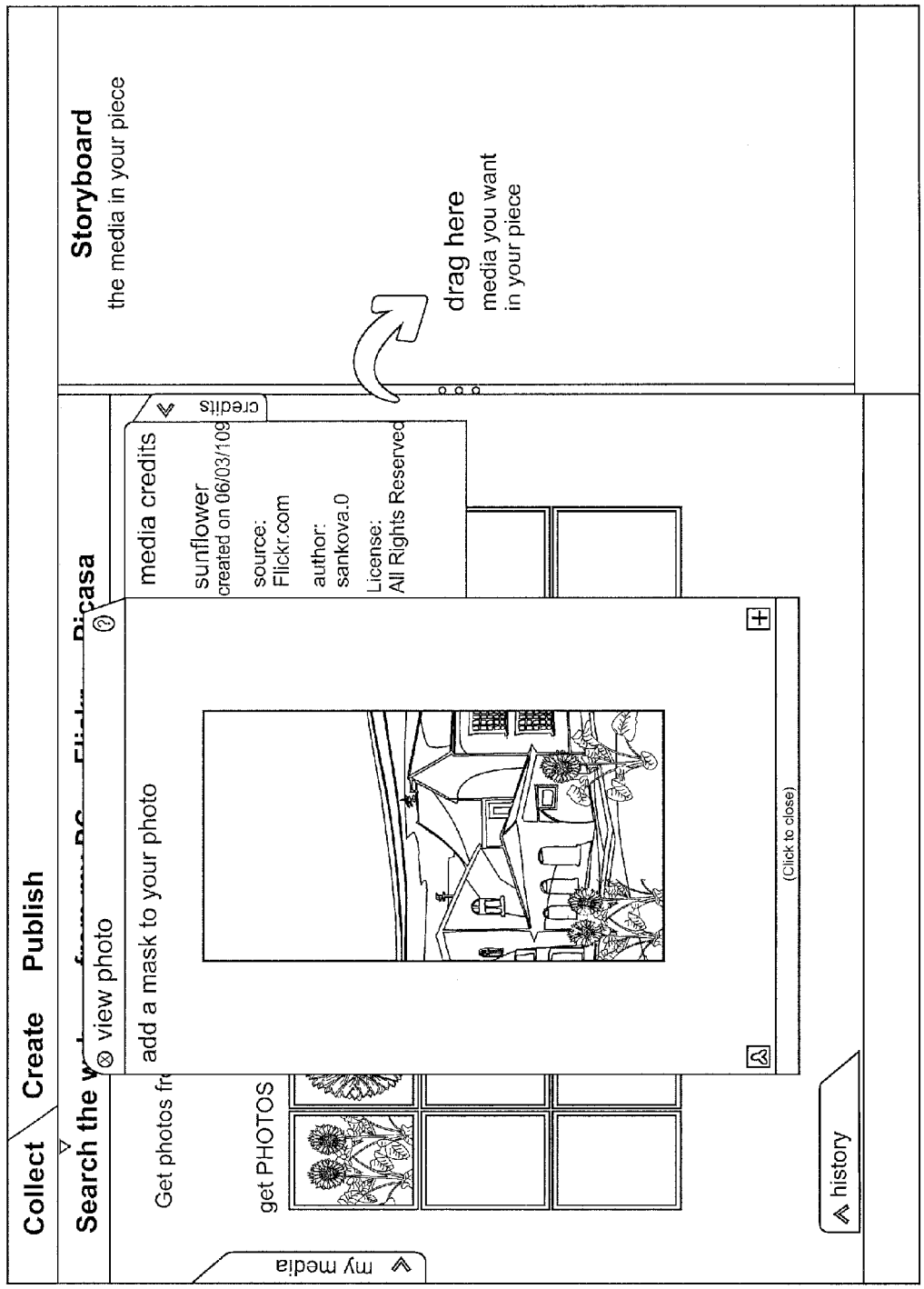

Media may be clustered based on time and author of the media. If the user selects the cluster mode from the media page (FIG. 2D), the system performs a simple time based clustering using a sliding window. If consecutive photos fall within the window they are clustered together. The window duration is chosen based on a heuristic, generally, between for example, 10 seconds and 15 minutes are use based on the search provider. For example, as shown in FIG. 2E, each media item includes credits such as date created, source (Flickr.com), and author (Sankova.O). As such, in one embodiment, those photos collected within a predetermined time frame by the same author may be clustered together. In this regard, the size or number or media items in each cluster may vary. In an alternative embodiment, the user might be able to interactively adjust the window. Because large clusters can be undesirable, the system may split clusters above a predetermined maximum size. To split a cluster a sorted list of time differentials is created. The system then attempts to cluster by the largest time difference until all sub-clusters are smaller than the maximum predetermined cluster size.

The architecture allows explicit media to be added to the storyboard 124 or the entire query itself to be added to the storyboard 124. Placing desired media on the storyboard or clip board may be accomplished by dragging and dropping. As shown in FIG. 2B, the user can drag and drop desired individual pictures and/or clusters of pictures onto a storyboard 124 on the same screen as the collection depository 123. The pictures can be edited into stacks if desired. In another example, the collect module 184 provides media on a user's media page (i.e., not placed on the storyboard). For example, with videos, a desired video can be placed onto the user's media page by typing in the corresponding URL in YouTube. The system can then display the complete as well as a series of shorter video clips.

In this regard, the collect module or step enables the user to collect video and to separate or section the video into a cluster of smaller separate video segments. More specifically, media including video, as well as audio/music, may be divided into a plurality of relatively smaller segments of a predetermined duration. The segment duration may be based on time or data size. The whole video or selected shorter clips, as well as the photos can then be dragged and dropped (relocated) into the storybook 124 section to create a presentation from the media collected.

The collect module 184 or step may include a "save" icon to enable the user to save media collected from the search source or external API in the collect depository 123 or storyboard 124 so that when the storyboard 124 is accessed, the media is easily accessible and available for use in editing or creating rich multimedia presentations in the storyboard 124. In addition, the collect module 184 permits the search query to be saved; allowing for a "shortcut" to the query to be quickly accessed.

Figure 2F:
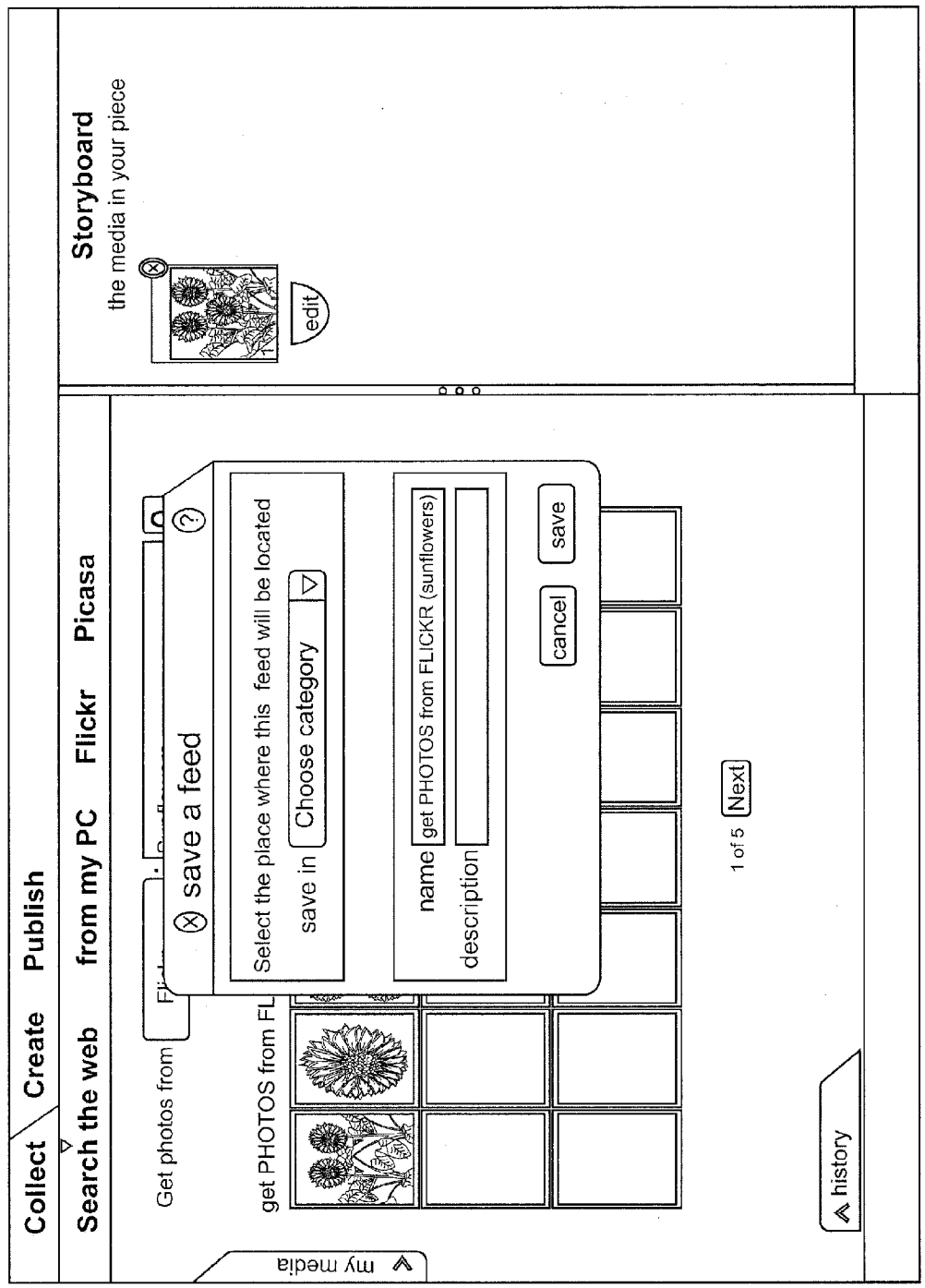
Figure 2G:
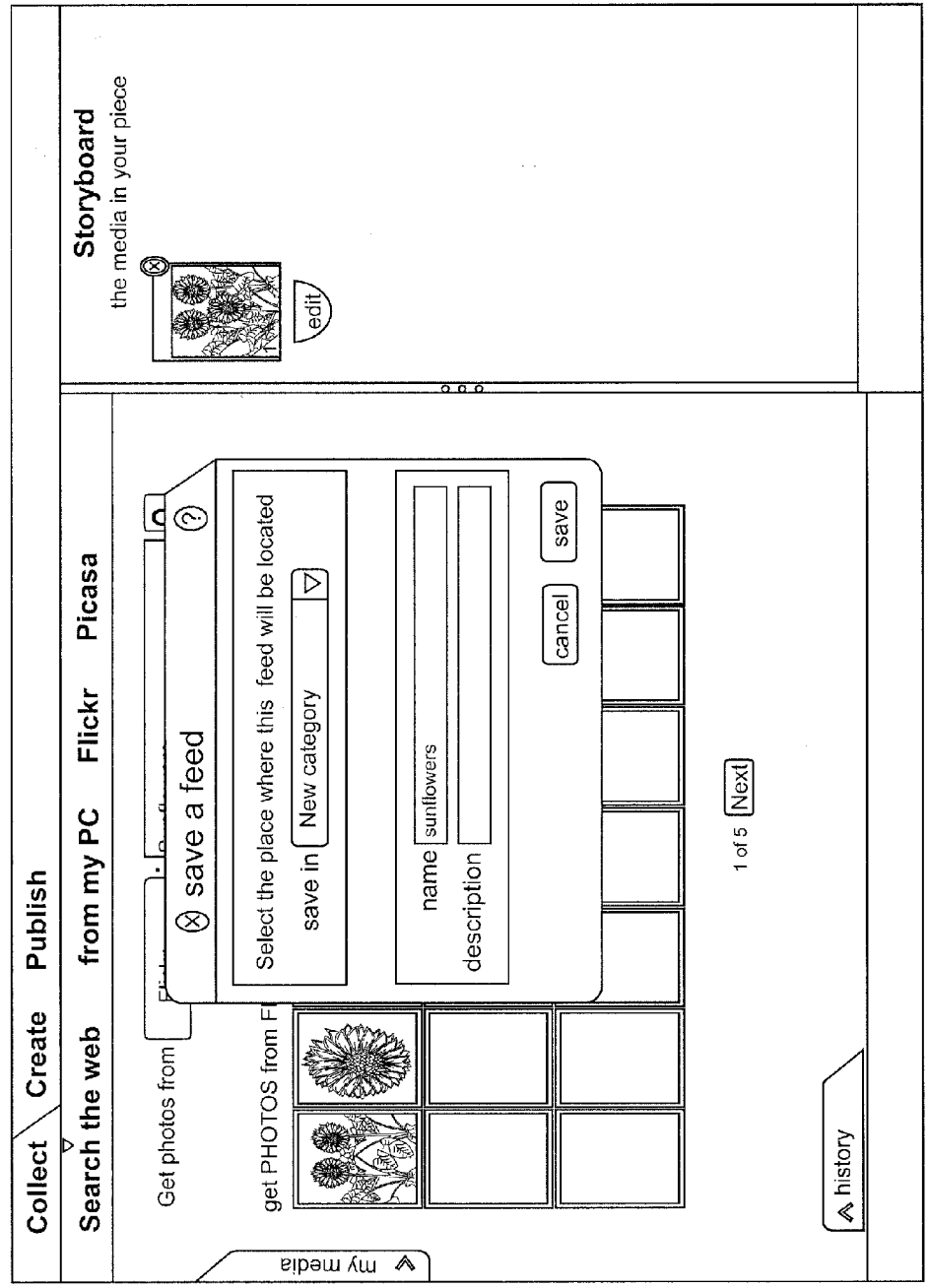
Figure 2H:
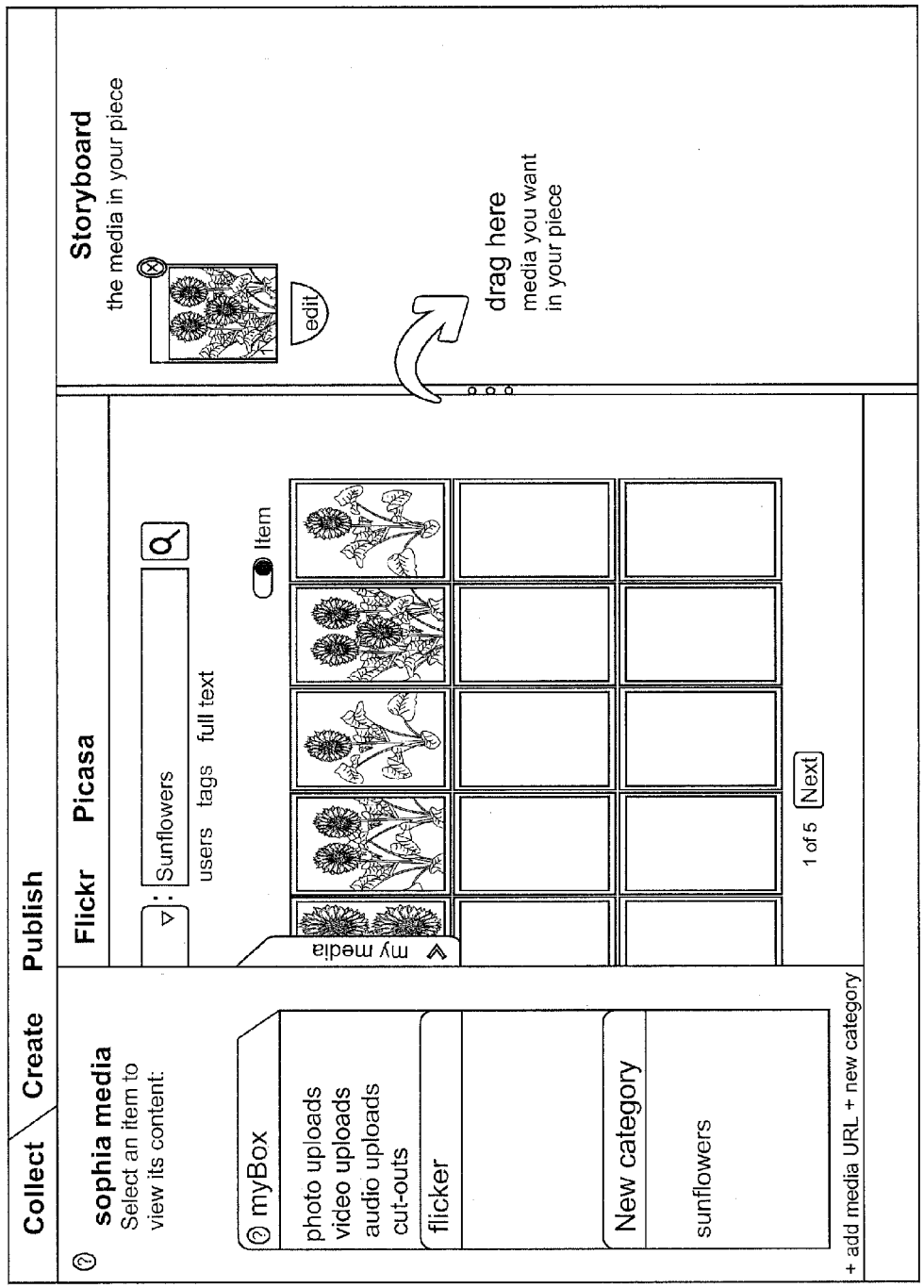
Figure 21:
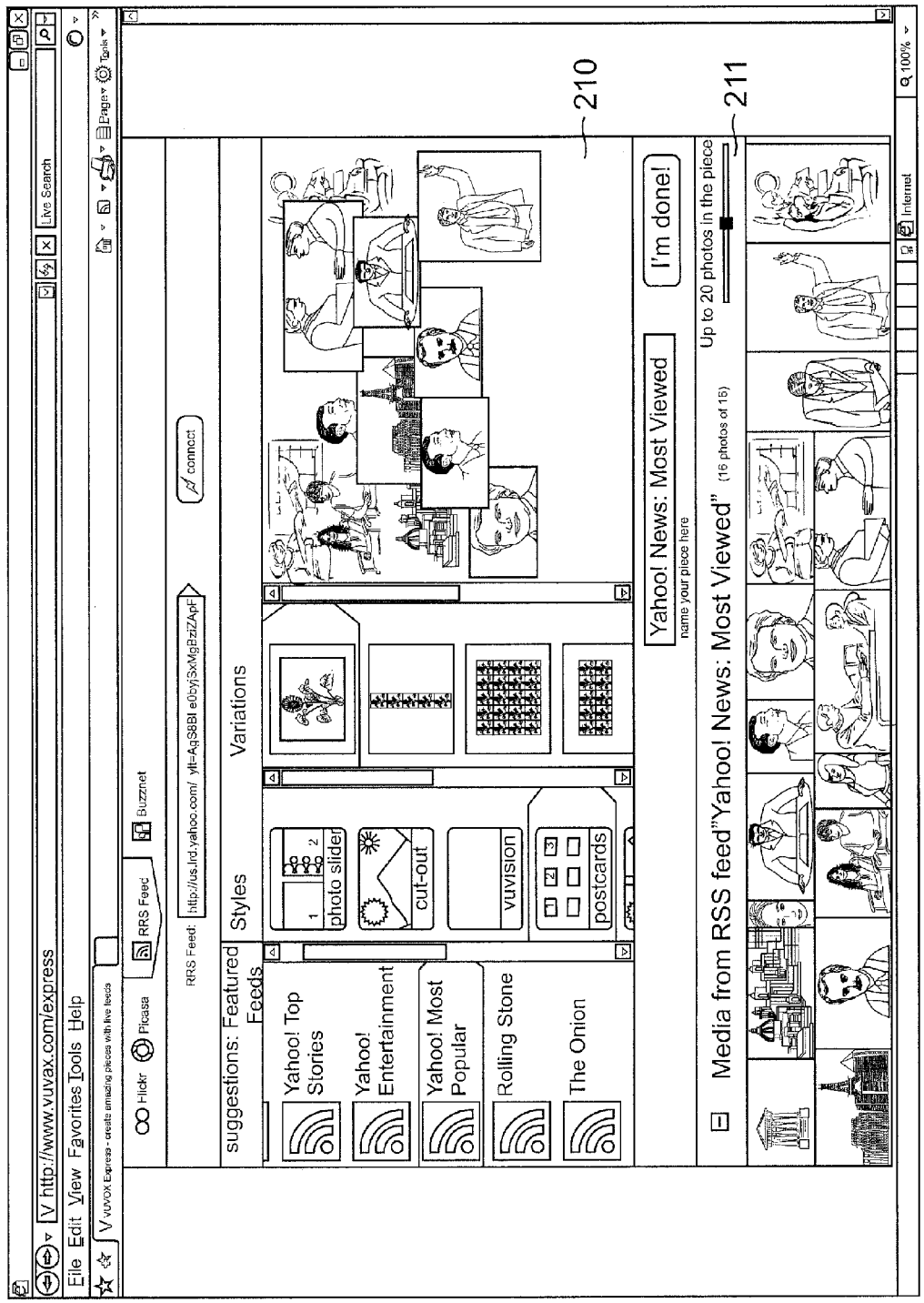
Figure 2J:
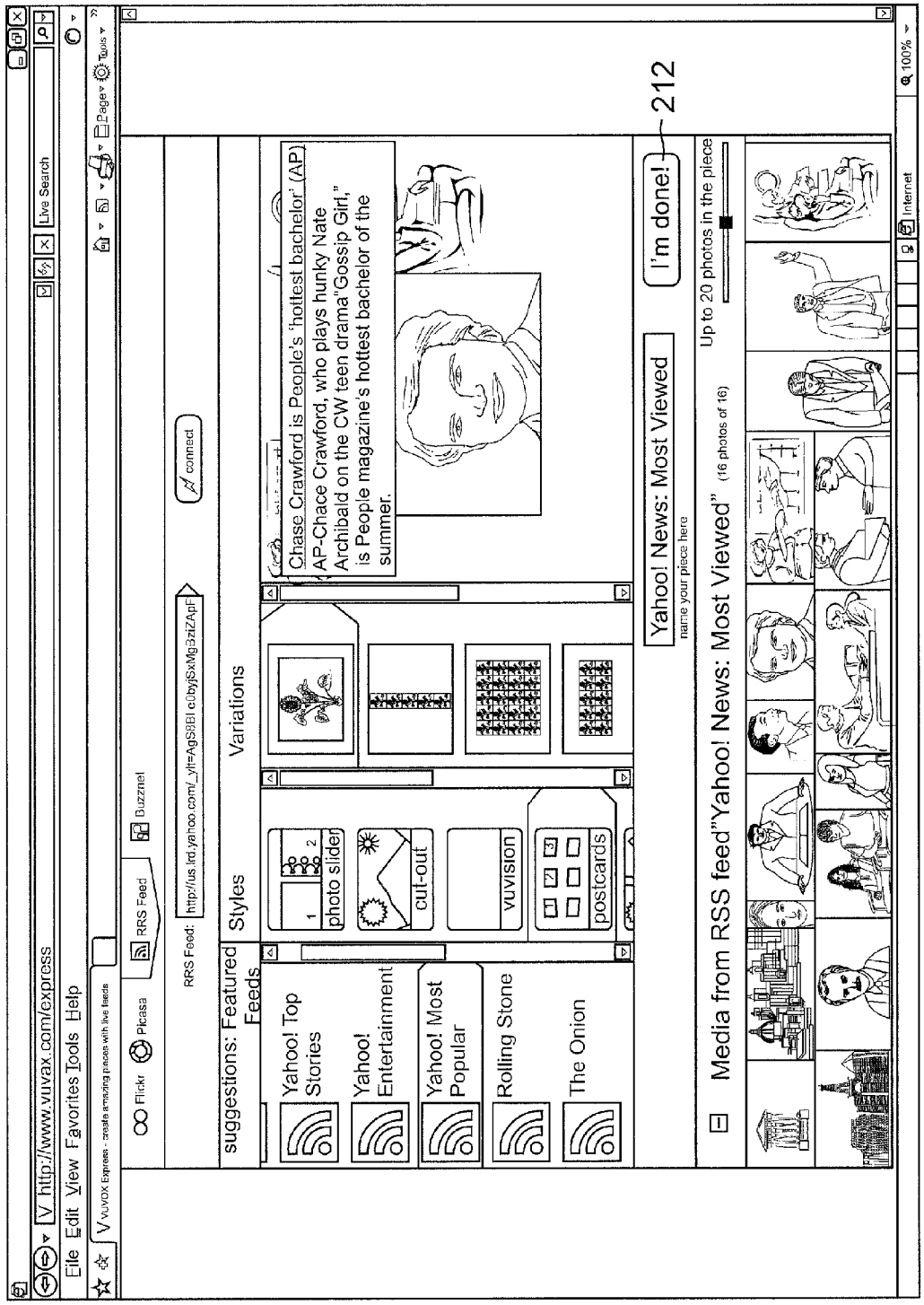

In this regard, as shown in FIGS. 2C and 2D, all of the search-based modules 200-203 support persisting the query inputs, i.e., search query, to the search source as a Feed or network search path. In this regard, when the user starts a session, for example, with a particular application, the server returns a list of custom categories the user has created, and a list of Feeds the user has created (FIG. 2F). Each Feed has a title, a category, and an xml-based persistence of the user inputs (FIG. 2G). The user then saves the search query as a network search or file path. If the user selects the Feed, i.e. "New category" and "sunflowers" from one of the multiple search tabs within the "my media" tab the application resubmits the query and displays the resulting media (FIG. 2H).

In an alternative version of a Feed, the storyboard contents can be persisted as a Feed to allow saved references from multiple sources in one book marked location. Rather than persisting query inputs, the Feed contains an xml representation of the clusters of media with sufficient information to reconnect to the media, typically a URL, media type, and possibly some additional user created metadata such as a title or caption. The architecture further allows "dynamic" Feeds to search and saved for later use in creating multimedia presentations.

In an example of "dynamic media", the user can search photos in the user's Picasa account or an RSS Feed of "Yahoo Most Viewed" (FIG. 2I). In one embodiment, the photos or RSS Feed are automatically shown at the bottom of the viewing page, as well as in a style viewing area 210 corresponding to the style chosen. As shown in FIG. 2I, the RSS Feed of Yahoo's Most Viewed is displayed in a postcard style corresponding to the selected postcard style. The viewing page allows the user to select via a select slider 211 how many photos, videos, etc., are to be in the collected presentation page. For example, the number may default to twenty, but the user may select a different number and new photos with automatically be added or deleted from the currently viewed photos. Individual photos, videos, etc., which represent some event, may be selected within the style viewing area 210 to access event related information and/or an event related URL where the related information provided.

Figure 2K:
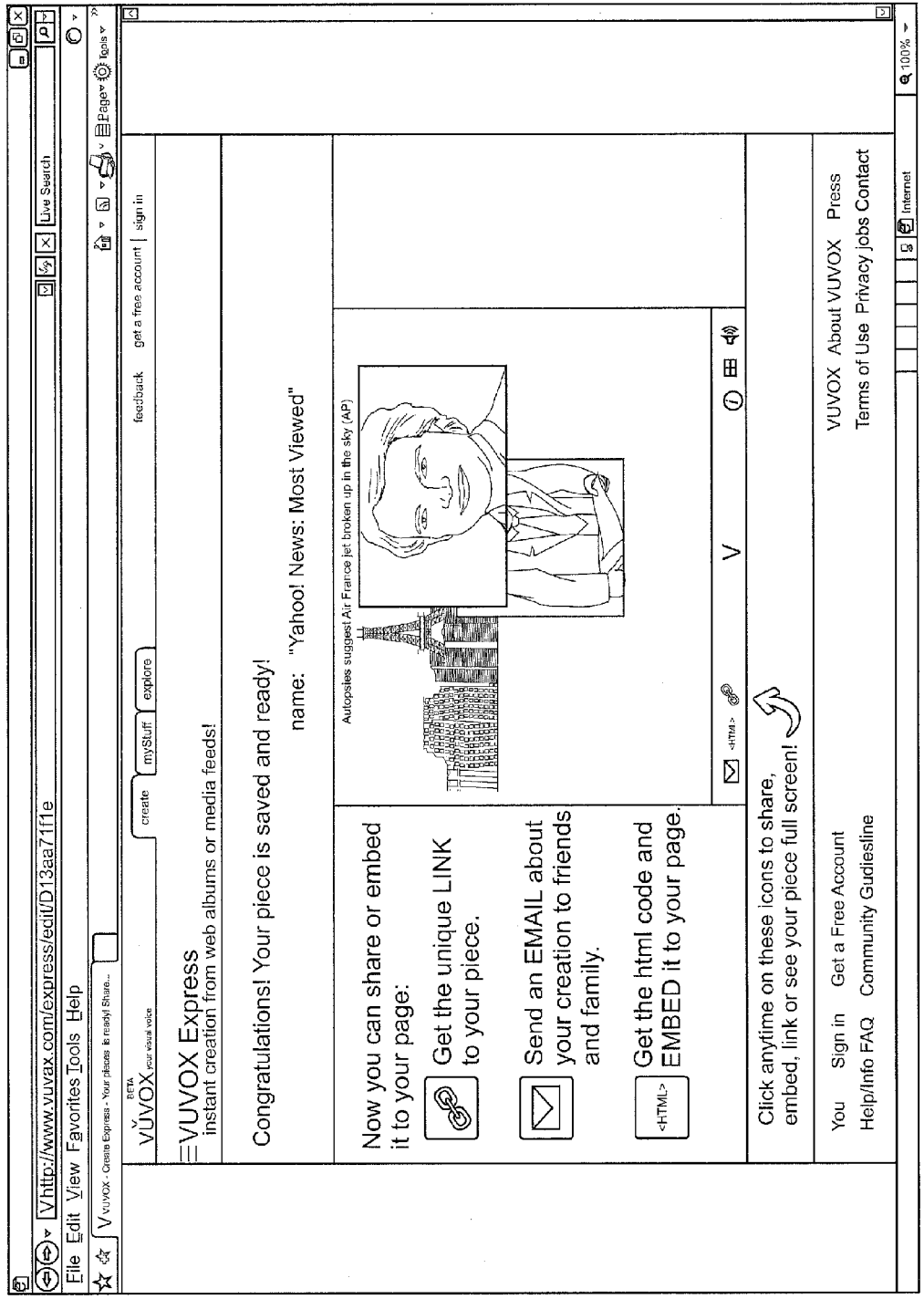
Figure 2L:
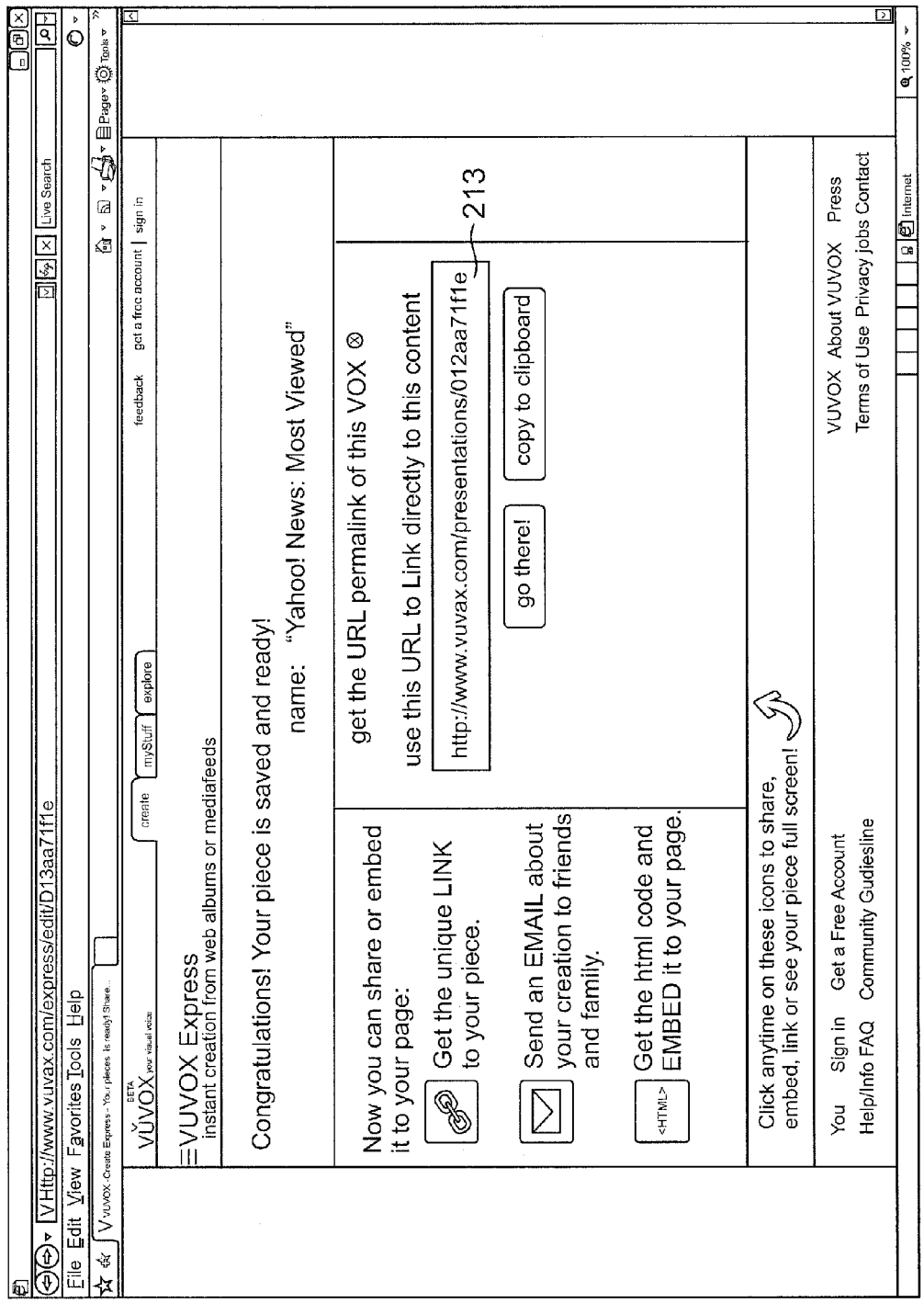

As mentioned above, just as photos from Flickr or other sources may be saved in the database 190, so to may the "dynamic" content of the RSS Feed and similar search services by selection of a save or "I'm done" icon 212, and added to a multimedia presentation. In this regard, in saving the "dynamic" content of the RSS Feed ("Yahoo Most Viewed") a URL permalink (network search path or file path) 213 is assigned to the RSS Feed (FIGS. 2K and 2L). The URL permalink 213 may then be added as a "hot spot" or as an individual frame within a multimedia presentation that is slightly different each time the presentation is viewed due to its "dynamic" or changing nature. The "dynamic" media object can refer to API calls, RSS Feeds, search queries, or any type of external call to a database where the parameters of that query can retrieve data or media dynamically.

Figure 2M:
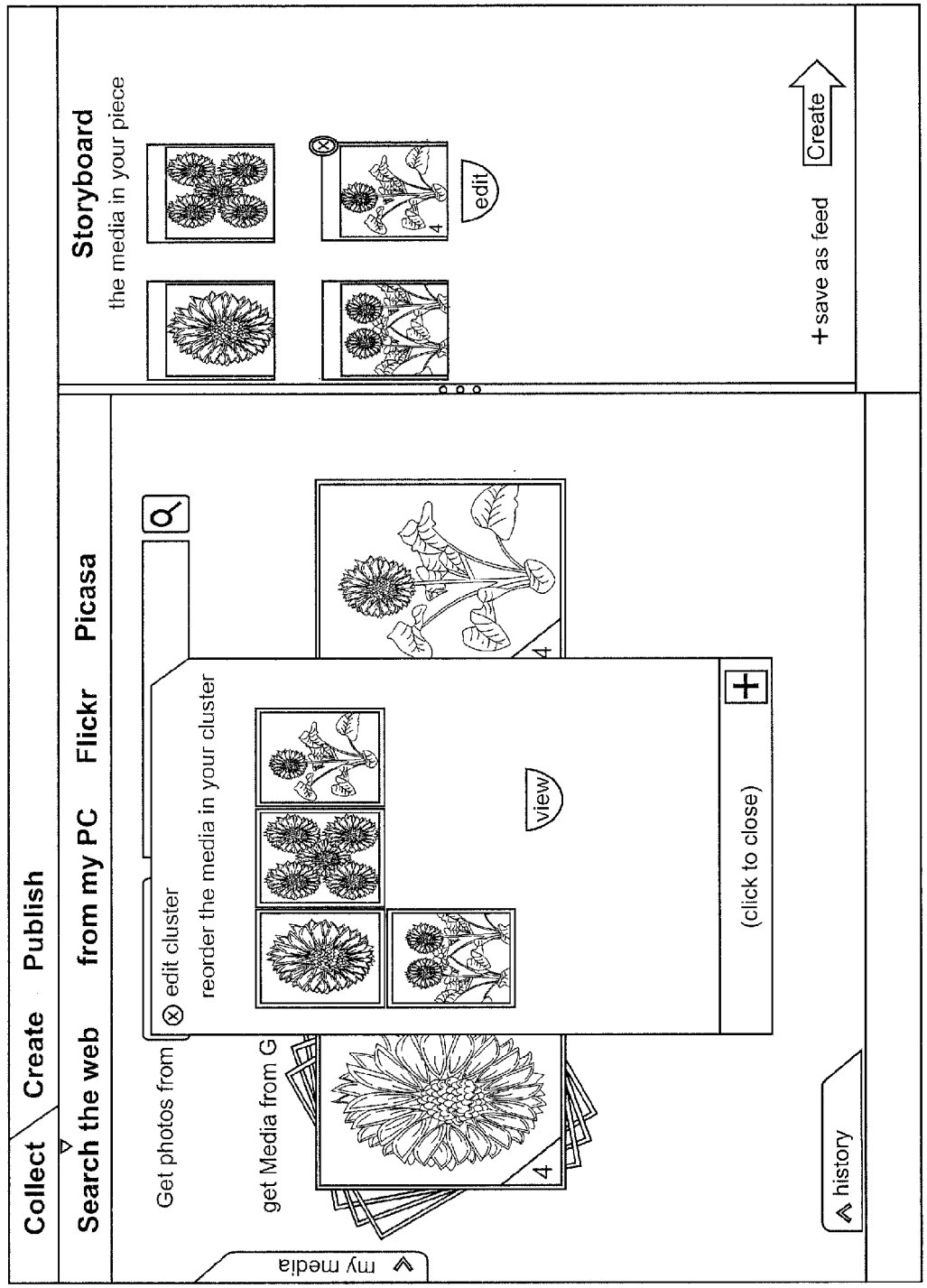

As indicated above, once collected, the media may be saved and further categorized in the database 190 and edited on the system site via the service provider server 180. Editing may occur on the media page or in the storyboard and include one or more of sizing, rotating, overlying, moving and stacking various media backward and forward with an overlay or stack (FIG. 2M). Video may be broken up automatically by the service provider server 180 into smaller segments. Selected video segments may be combined and/or used as desired. Selected media may be placed on a virtual storyboard, such as a clipboard, on the same screen as the collection of media. Media may be edited either in the collection area/media page or in the storyboard. In still another example, uploading media may be delayed until editing is completed.

As shown in FIGS. 2N-2R, the service provider server 180 may automatically suggest a story idea to launch the creative process, or the user 102 may select a specific style or presentation tool. Within the presentation, there may be multiple styles, such as a picture frame, a television, a billboard, etc. In one implementation, media from the storyboard may be dragged and dropped onto the presentation. In this regard, media may be placed within the viewing window of each type of style.

Alternatively, the user can create a presentation from the media in the storybook section by selecting a style, such as a slide show, a photo slider, a room with different viewing areas including picture frames, etc. The media is then automatically loaded into the selected style. For example, a clustered set of photos may automatically play in frame, and a video clip may automatically play on a television. In another example, the branches of a tree are automatically filled with different selected media for viewing. Another style may be a page of postcards, such that when that style is selected, the previously chosen media is automatically filled into the postcards on a single page.

Figure 2N:
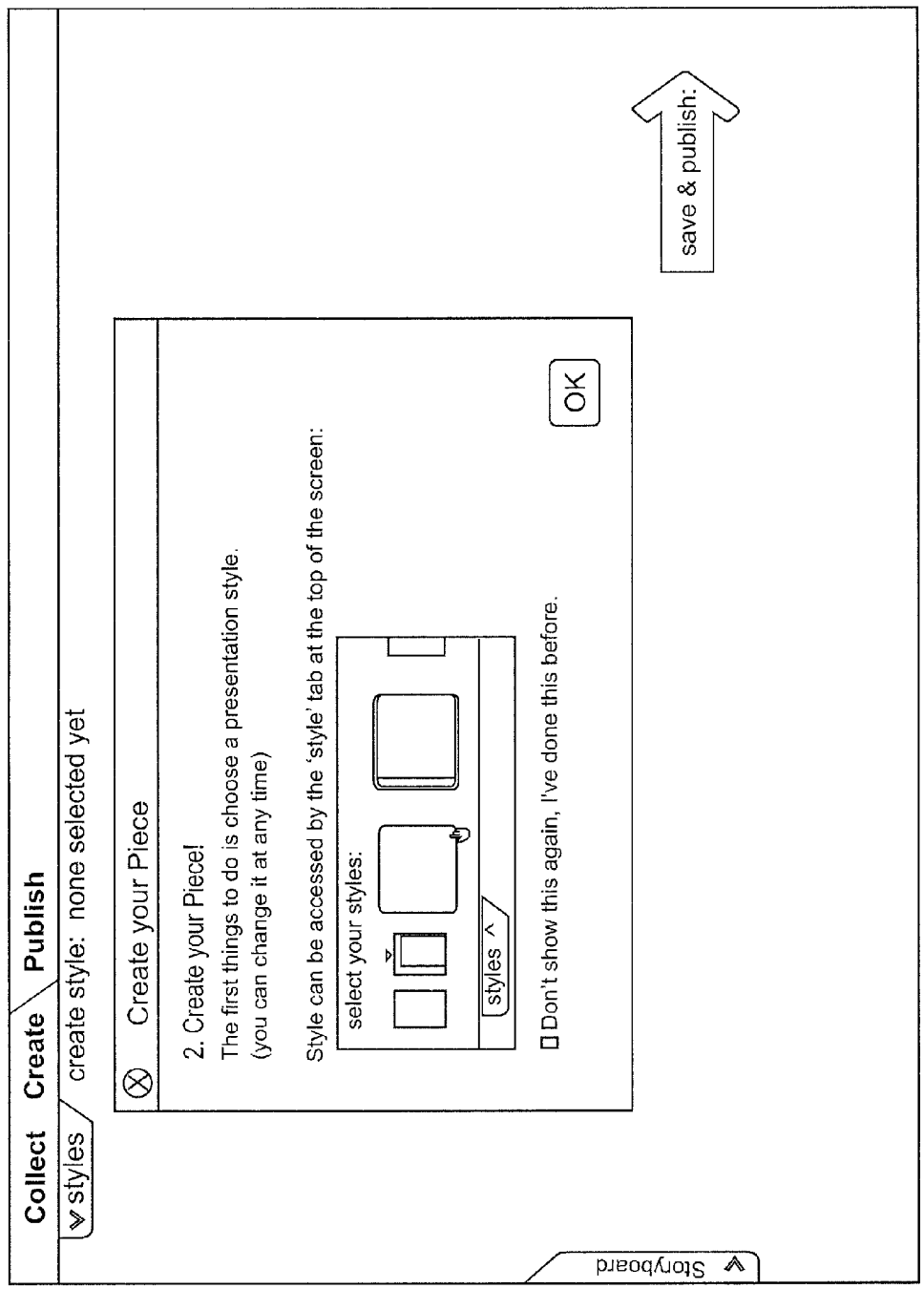
Figure 20:
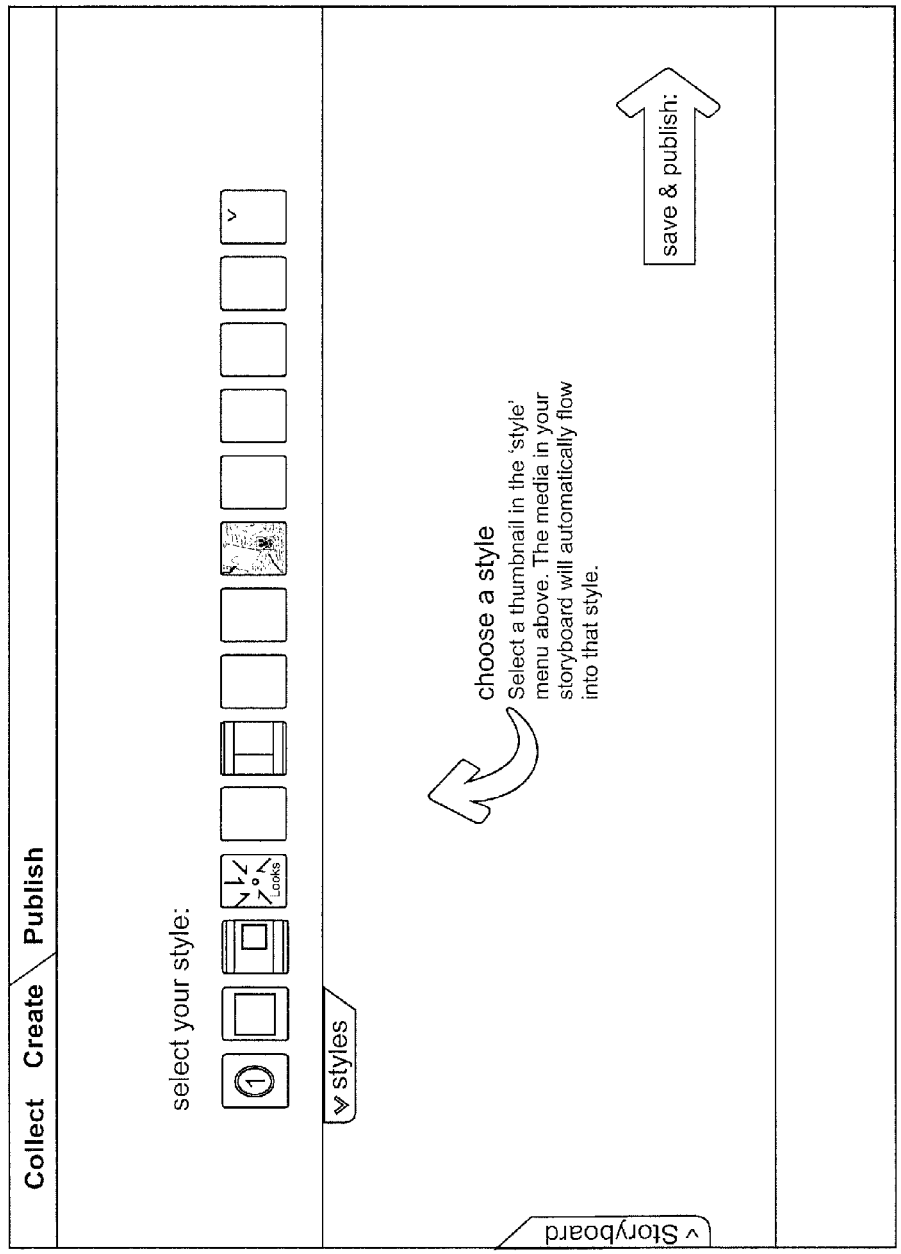

More specifically, in one embodiment, once media is collected, a storyboard located on the right side of the user interface may be populated with the collected media by dragging and dropping one or more of the media items or cluster of media items collected from the various media sources from the media collection area onto the storyboard for later use in creating a media piece (FIG. 2B). In this regard, the storyboard may include two items collected from the web, one item uploaded from a PC, and a cluster of four items also collected from the web (FIG. 2D). Media positioned on the storyboard may be edited prior to creating a media piece. For example, individual items of media in a media cluster may be reordered (FIG. 2M). Once media has been collected and edited, media piece creation may proceed by clicking the create arrow at the bottom of the user interface and then choosing to proceed to the create module 186 (FIG. 2N).

Figure 2P:
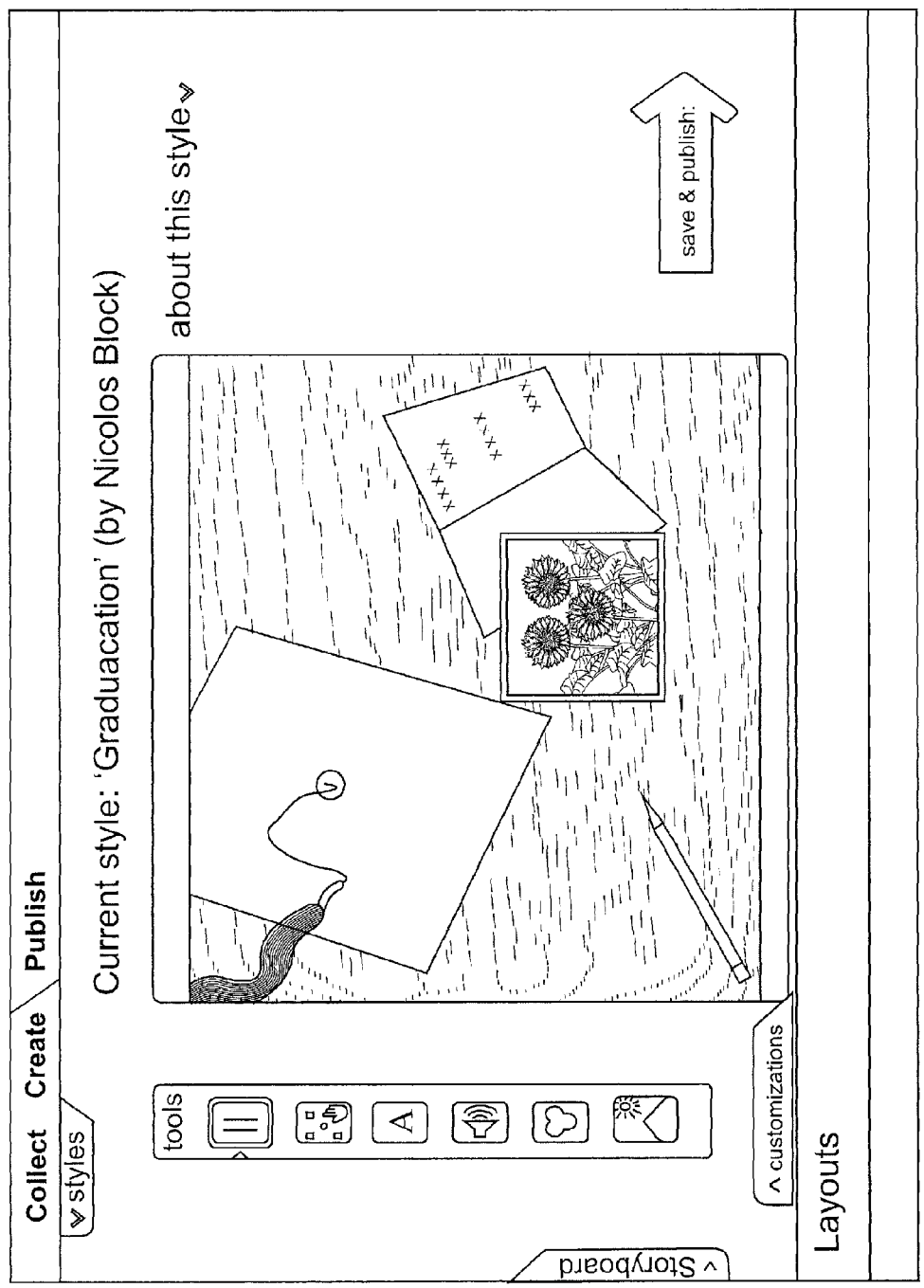
Figure 2Q:
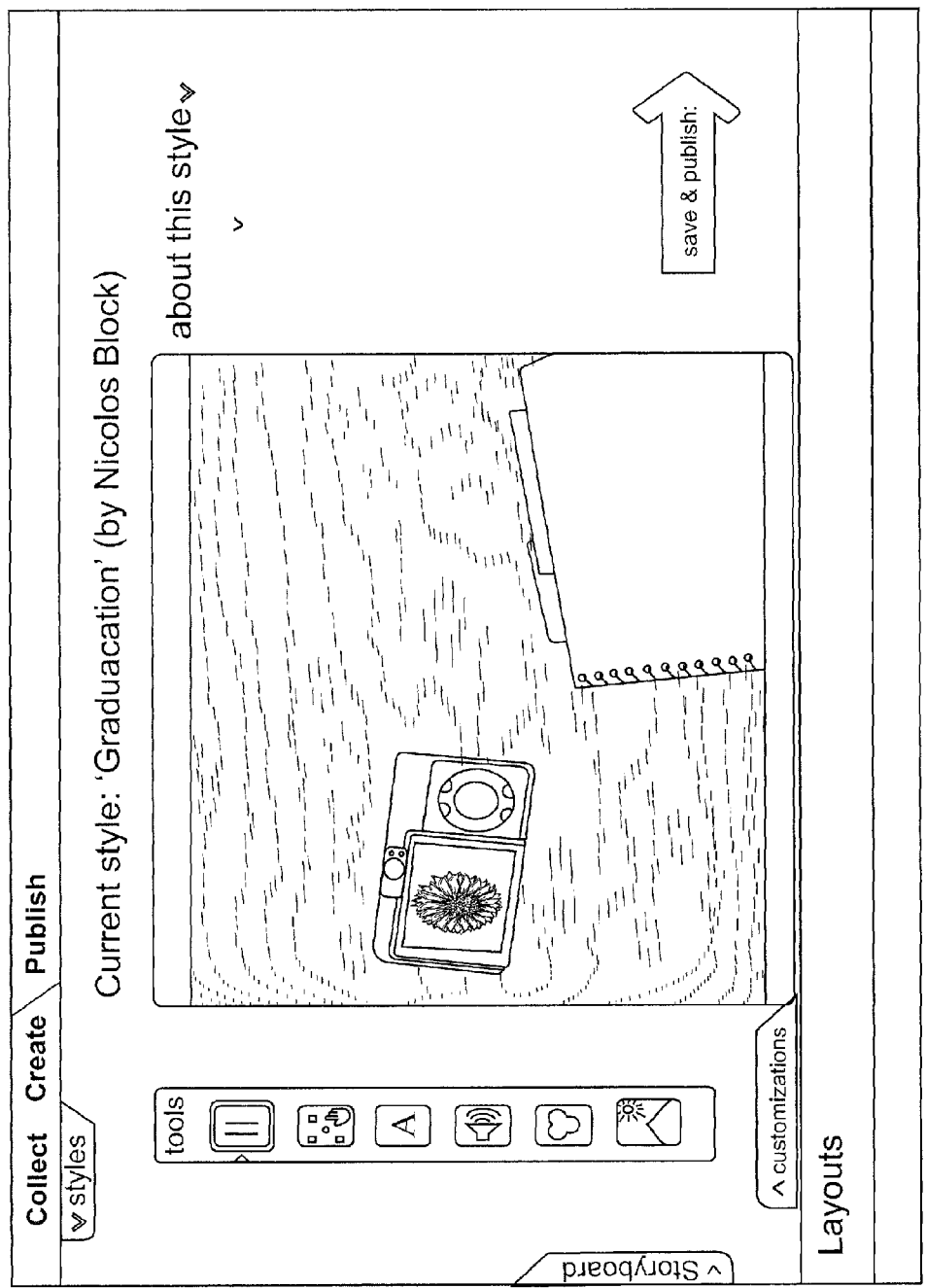
Figure 2R:
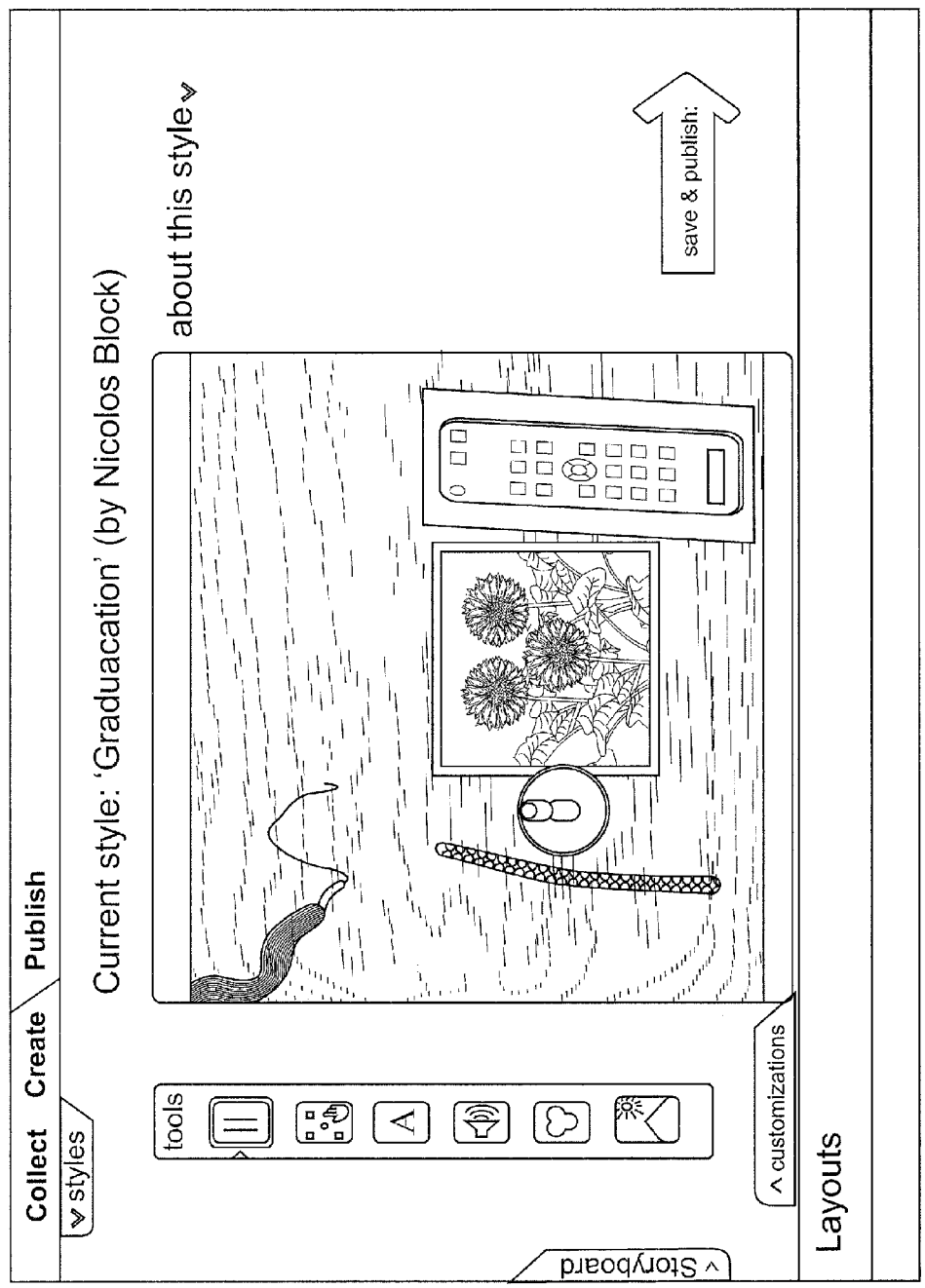

As indicated above, to begin the process of creating a media piece the user may select a thumbnail from the presentation "styles" menu (FIG. 2O). Presentation styles may include, but are not limited to, a picture frame, billboard, kaleidoscope, street scene, landscape, etc. Once a "style" is selected media from the storyboard will automatically flow into or populate the chosen "style" (FIGS. 2P and 2R). In this regard, the presentation media shown in FIG. 2D has automatically populated corresponding presentation elements with the chosen presentation style. Some styles, which support movement of media as part of a presentation style, may provide the user with the ability to customize various characteristics of the movement such as speed of media rotation, etc., within the style.

Once the style is chosen, the user may also select different variations of the style. Each particular style typically has a different set of variations suited for that style. For example, for the tree style, a user may select different types of frames on the branches to contain the media, a specific background may be selected from a user image, and different style trees may be used. For the photo slider, different types and styles of frames may be used, as well as different types of presentations, e.g., spacing between photos, no spacing, and background selection. For the page of postcards, the user may select different configurations of the postcards on the page as well as different backgrounds for the page.

Once in the style presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. This further editing may depend on the style chosen, as different styles may have different editing capabilities. In one aspect, the editing may be achieved in real-time so that the user 102 may quickly and easily see the results and change them as needed.

In one embodiment, the publish module 186 enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multimedia channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

The collect, create, and publish modules 184, 186, 188 may be combined, used, and/or modified to provide the user 102 with different initial choices regarding the type of presentation and features desired for creating the multimedia presentation. The choices may be a simple, easy to use tool to quickly build presentations with dynamic content from RSS feeds and online albums. Accordingly, the user 102 may select a presentation style and, as detailed above, link it to the user's media libraries through RSS Feeds that maintain an "always on" permalink to the content source.

Figure 3:
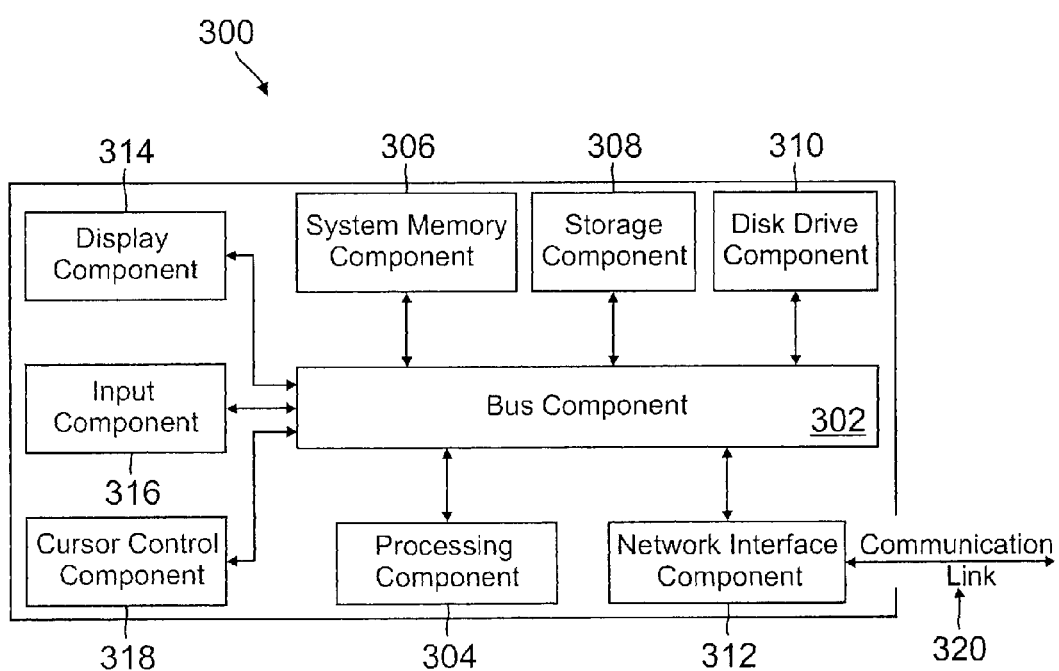
FIG. 3 is a block diagram of a computer system suitable for implementing one or more embodiments of the present disclosure.

FIG. 3 is a block diagram of a computer system 300 suitable for implementing one or more embodiments of the present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 300 in a manner as follows.

In accordance with various embodiments of the present disclosure, computer system 300, such as a personal computer and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), and cursor control component 318 (e.g., mouse or trackball). In one implementation, disk drive component 310 may comprise a database having one or more disk drive components.

In accordance with embodiments of the present disclosure, methods described herein are developed as a program language and embodied in a processing of computer-readable medium as executable instructions that can be used to direct a processing program when used by the computer system 300. In this regard, the computer system 300 may perform specific operations by processor 304 executing one or more sequences of one or more instructions contained in system memory component 306. Such instructions may be read into system memory component 306 from a computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 320 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

We claim:

1. A computer system for the collection and segmentation of media, comprising:
   at least one processor; and
   a memory coupled to the at least one processor and storing instructions that, when executed by the at least one processor, perform a method, comprising:
      displaying media items in a collection depository on a user interface, wherein the media items comprise one or more of audio media items and video media items;
      receiving a selected style for a visual presentation, wherein the selected style comprises two or more elements each having a corresponding data size limitation;
      automatically generating two or more segments from the media items based on the data size limitation of each of the two or more elements; and
      automatically populating the two or more elements of the selected style with at least one of the two or more segments.

2. The computer system of claim 1, further comprising instructions for:
   selecting a media search source via the user interface; and
   providing a form-based interface that allows entry of inputs to form a media search query.

3. The computer system of claim 2, further comprising instructions for submitting the media search query to the media search source.

4. The computer system of claim 3, further comprising instructions for receiving a media search result for viewing on the user interface based on the media search query.

5. The computer system of claim 1, further comprising instructions for relocating at least one of the two or more segments into a storyboard for use in creating a network multimedia presentation.

6. The computer system of claim 5, further comprising instructions for embedding the at least one of the two or more segments into the network multimedia presentation for viewing over a network.

7. The computer system of claim 1, further comprising instructions for editing the media items using input received in a media editing tool provided in the user interface.

8. The computer system of claim 1, wherein each data size limitation is based, at least in part, on received input.

9. The computer system of claim 1, wherein each data size limitation is based, at least in part, on the selected style.

10. A computer implemented method, comprising:
    displaying media items in a collection depository on a user interface of a computing device;
    receiving a selected style for a visual presentation, wherein the selected style comprises two or more elements, each having a size limitation for content;
    receiving a selection a subset of the media items;
    automatically generating two or more segments from the subset of media items based, at least in part, on the size limitation of the two or more elements; and
    automatically populating the two or more elements of the selected style with at least one of the two or more segments.

11. The computer implemented method of claim 10, further comprising:
    receiving a selection of a media search source via the user interface;
    providing a form-based interface that allow the entry of inputs to form a media search query; and
    submitting the media search query to the media search source.

12. The computer implemented method of claim 11, further comprising receiving a media search result for viewing on the user interface based on the media search query.

13. The computer implemented method of claim 10, further comprising:
relocating at least one of the two or more segments into a storyboard for use in creating a network multimedia presentation; and
embedding the at least one of the two or more segments into the network multimedia presentation for viewing over a network.

14. The computer implemented method of claim 10, further comprising instructions for editing the subset of media items using input received in a media editing tool.

15. A non-transitory computer-readable storage medium encoding computing executable instructions that, when executed by a processor, perform a method, comprising:
displaying media items in a collection depository on a user interface of a computing device;
receiving a selection of a subset of media items;
receiving a selection of a style for a visual presentation, wherein the style comprises two or more elements each having a corresponding size limitation;
automatically generating two or more segments from the subset media items based on one or more of the size limitations when input is received that indicates that the subset of media items are to be placed in at least one of the two or more elements; and
automatically populating the two or more elements with at least one of the at least two or more segments.

16. The non-transitory computer-readable storage medium of claim 15, further comprising instructions for:
selecting a media search source via the user interface;
providing a form-based interface that allows entry of inputs to form a media search query; and
submitting the media search query to the media search source.

17. The non-transitory computer-readable storage medium of claim 16, further comprising instructions for receiving a media search result for viewing on the user interface based on the media search query.

18. The non-transitory computer-readable storage medium of claim 15, further comprising instructions for:
relocating one or more of the two or more segments into a storyboard for use in creating a network multimedia presentation; and
embedding one or more of the two or more segments into the network multimedia presentation for viewing over a network.

19. The non-transitory computer-readable storage medium of claim 15, further comprising instructions for editing the subset of media items based on input received in a media editing tool.

* * * * *